(12) United States Patent
Sanders et al.

(10) Patent No.: US 9,021,529 B2
(45) Date of Patent: Apr. 28, 2015

(54) CONTENT RECORDATION TECHNIQUES

(75) Inventors: Scott D. Sanders, Sammamish, WA (US); Daniel J. Zigmond, Menlo Park, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1332 days.

(21) Appl. No.: 10/891,579

(22) Filed: Jul. 15, 2004

(65) Prior Publication Data

US 2006/0117351 A1 Jun. 1, 2006

(51) Int. Cl.
| | |
|---|---|
| *H04N 5/445* | (2011.01) |
| *H04N 5/782* | (2006.01) |
| *H04N 21/4227* | (2011.01) |
| *H04N 21/433* | (2011.01) |
| *H04N 21/458* | (2011.01) |
| *H04N 21/472* | (2011.01) |
| *H04N 21/482* | (2011.01) |
| *H04N 21/84* | (2011.01) |
| *H04N 5/765* | (2006.01) |
| *H04N 5/775* | (2006.01) |
| *H04N 5/781* | (2006.01) |

(52) U.S. Cl.
CPC ........... *H04N 5/782* (2013.01); *H04N 21/4227* (2013.01); *H04N 21/4334* (2013.01); *H04N 21/4583* (2013.01); *H04N 21/47214* (2013.01); *H04N 21/4828* (2013.01); *H04N 21/84* (2013.01); *H04N 5/765* (2013.01); *H04N 5/775* (2013.01); *H04N 5/781* (2013.01)

(58) Field of Classification Search
USPC ........... 725/110–113, 131–132, 151–153, 38, 725/50; 709/107, 218, 223, 224, 219
See application file for complete search history.

(56) References Cited

U.S. PATENT DOCUMENTS

| | | |
|---|---|---|
| 4,706,121 A | 11/1987 | Young |
| 4,894,789 A | 1/1990 | Yee |
| 4,908,713 A | 3/1990 | Levine |
| 4,945,563 A | 7/1990 | Horton et al. |
| 4,977,455 A | 12/1990 | Young |
| 5,010,499 A | 4/1991 | Yee |
| 5,025,837 A | 6/1991 | Gielen |
| 5,091,877 A | 2/1992 | Itoh et al. |
| 5,121,476 A | 6/1992 | Yee |
| 5,195,692 A | 3/1993 | Fujii et al. |

(Continued)

FOREIGN PATENT DOCUMENTS

| | | |
|---|---|---|
| EP | 0849946 | 6/1998 |
| EP | 0942595 | 9/1999 |

(Continued)

OTHER PUBLICATIONS

"Final Office Action", U.S. Appl. No. 11/115,669, (Jun. 11, 2009), 9 pages.

(Continued)

*Primary Examiner* — Annan Shang
(74) *Attorney, Agent, or Firm* — Micah Goldsmith; Judy Yee; Micky Minhas

(57) ABSTRACT

Content recordation techniques are described. In an implementation, a method includes querying electronic program guide (EPG) data to determine if a content item described in a recording document is available for recording. If the content item is available, a reference is added to a recording list for causing recordation of the content item.

29 Claims, 8 Drawing Sheets

(56) References Cited

U.S. PATENT DOCUMENTS

| | | |
|---|---|---|
| 5,223,924 A | 6/1993 | Strubbe |
| 5,226,079 A | 7/1993 | Holloway |
| 5,247,364 A | 9/1993 | Banker et al. |
| 5,293,357 A | 3/1994 | Hallenbeck |
| 5,307,173 A | 4/1994 | Yuen et al. |
| 5,335,079 A | 8/1994 | Yuen et al. |
| 5,351,075 A | 9/1994 | Herz |
| 5,355,484 A | 10/1994 | Record et al. |
| 5,473,673 A | 12/1995 | Van Wijk et al. |
| 5,485,553 A | 1/1996 | Kovalick et al. |
| 5,488,409 A | 1/1996 | Yuen et al. |
| 5,508,731 A | 4/1996 | Kohorn |
| 5,515,173 A | 5/1996 | Mankovitz et al. |
| 5,526,035 A | 6/1996 | Lappington et al. |
| 5,528,490 A | 6/1996 | Hill |
| 5,528,759 A | 6/1996 | Moore |
| 5,532,732 A | 7/1996 | Yuen et al. |
| 5,539,822 A | 7/1996 | Lett |
| 5,565,895 A | 10/1996 | Akatsuka |
| 5,589,832 A | 12/1996 | Grundvig et al. |
| 5,600,573 A | 2/1997 | Hendricks et al. |
| 5,600,632 A | 2/1997 | Schulman |
| 5,617,526 A | 4/1997 | Oran et al. |
| 5,619,247 A | 4/1997 | Russo |
| 5,648,824 A | 7/1997 | Dunn et al. |
| 5,659,653 A | 8/1997 | Diehl |
| 5,684,153 A | 11/1997 | Geen et al. |
| 5,686,954 A | 11/1997 | Yoshinobu et al. |
| 5,692,214 A | 11/1997 | Levine |
| 5,697,844 A | 12/1997 | Von Kohorn |
| 5,726,702 A | 3/1998 | Hamaguchi et al. |
| 5,737,552 A | 4/1998 | Lavallee et al. |
| 5,752,159 A | 5/1998 | Faust et al. |
| 5,761,602 A | 6/1998 | Wagner et al. |
| 5,761,606 A | 6/1998 | Wolzien |
| 5,771,354 A | 6/1998 | Crawford |
| 5,774,664 A | 6/1998 | Hidary et al. |
| 5,774,666 A | 6/1998 | Portuesi |
| 5,778,181 A | 7/1998 | Hidary et al. |
| 5,796,828 A * | 8/1998 | Tsukamoto et al. ........... 380/203 |
| 5,796,967 A | 8/1998 | Filepp et al. |
| 5,798,758 A | 8/1998 | Harada et al. |
| 5,798,785 A | 8/1998 | Hendricks et al. |
| 5,801,747 A | 9/1998 | Bedard |
| 5,818,441 A | 10/1998 | Throckmorton et al. |
| 5,818,935 A | 10/1998 | Maa |
| 5,826,165 A | 10/1998 | Echeita |
| 5,832,223 A | 11/1998 | Hara et al. |
| 5,835,712 A | 11/1998 | Dufresne |
| 5,838,314 A | 11/1998 | Neel et al. |
| 5,844,620 A | 12/1998 | Coleman et al. |
| 5,845,260 A | 12/1998 | Nakano et al. |
| 5,848,352 A | 12/1998 | Dougherty |
| 5,848,396 A | 12/1998 | Gerace |
| 5,848,397 A | 12/1998 | Marsh |
| 5,855,008 A | 12/1998 | Goldhaber |
| 5,857,190 A | 1/1999 | Brown |
| 5,861,881 A | 1/1999 | Freeman et al. |
| 5,862,220 A | 1/1999 | Perlman |
| 5,864,823 A | 1/1999 | Levitan |
| 5,867,208 A | 2/1999 | McLaren |
| 5,873,076 A | 2/1999 | Barr et al. |
| 5,878,222 A * | 3/1999 | Harrison ..................... 725/139 |
| 5,880,768 A | 3/1999 | Lemmons et al. |
| 5,886,731 A | 3/1999 | Ebisawa |
| 5,889,950 A | 3/1999 | Kuzma |
| 5,913,013 A | 6/1999 | Abecassis |
| 5,920,700 A | 7/1999 | Gordon et al. |
| 5,928,850 A | 7/1999 | Murai et al. |
| 5,929,849 A | 7/1999 | Kikinis |
| 5,931,908 A | 8/1999 | Gerba |
| 5,937,331 A | 8/1999 | Kalluri et al. |
| 5,940,073 A | 8/1999 | Klosterman et al. |
| 5,943,467 A | 8/1999 | Beyers |
| 5,956,090 A | 9/1999 | Yamauchi |
| 5,961,603 A | 10/1999 | Kunkel et al. |
| 5,963,264 A | 10/1999 | Jackson |
| 5,978,828 A | 11/1999 | Greer et al. |
| 5,982,445 A | 11/1999 | Eyer et al. |
| 5,987,509 A | 11/1999 | Portuesi |
| 5,990,883 A | 11/1999 | Byrne et al. |
| 5,991,306 A | 11/1999 | Burns et al. |
| 5,991,596 A | 11/1999 | Cunningham et al. |
| 5,991,799 A | 11/1999 | Yen et al. |
| 6,002,394 A | 12/1999 | Schein et al. |
| 6,002,444 A | 12/1999 | Marshall et al. |
| 6,005,565 A | 12/1999 | Legall et al. |
| 6,006,256 A | 12/1999 | Zdepski |
| 6,006,265 A | 12/1999 | Rangan et al. |
| 6,008,836 A | 12/1999 | Bruck et al. |
| 6,009,410 A | 12/1999 | LeMole et al. |
| 6,011,537 A | 1/2000 | Slotznick |
| 6,012,086 A | 1/2000 | Lowell |
| 6,012,087 A | 1/2000 | Freivald |
| 6,016,497 A | 1/2000 | Suver |
| 6,018,359 A | 1/2000 | Kermode et al. |
| 6,018,768 A | 1/2000 | Ullman et al. |
| 6,021,426 A | 2/2000 | Douglis et al. |
| 6,023,585 A | 2/2000 | Perlman et al. |
| 6,023,698 A | 2/2000 | Lavey et al. |
| 6,025,868 A | 2/2000 | Russo |
| 6,026,435 A | 2/2000 | Enomoto |
| 6,029,045 A | 2/2000 | Picco et al. |
| 6,029,193 A | 2/2000 | Yamamoto |
| 6,029,195 A | 2/2000 | Herz |
| 6,034,689 A | 3/2000 | White et al. |
| 6,035,304 A | 3/2000 | Machida et al. |
| 6,038,367 A | 3/2000 | Abecassis |
| 6,048,764 A | 4/2000 | Suzuki et al. |
| 6,049,831 A | 4/2000 | Gardell et al. |
| 6,055,564 A | 4/2000 | Phaal |
| 6,057,872 A | 5/2000 | Candelore |
| 6,058,238 A | 5/2000 | Ng |
| 6,058,430 A | 5/2000 | Kaplan |
| 6,061,719 A | 5/2000 | Bendinelli et al. |
| 6,064,376 A | 5/2000 | Berezowski et al. |
| 6,064,440 A | 5/2000 | Born et al. |
| 6,075,568 A | 6/2000 | Matsuura |
| 6,078,961 A | 6/2000 | Mourad et al. |
| 6,081,842 A | 6/2000 | Shachar |
| 6,097,441 A | 8/2000 | Allport et al. |
| 6,108,706 A | 8/2000 | Birdwell |
| 6,125,388 A | 9/2000 | Reisman |
| 6,134,379 A | 10/2000 | LaMacchia |
| 6,141,488 A | 10/2000 | Knudson et al. |
| 6,141,678 A | 10/2000 | Britt |
| 6,154,771 A | 11/2000 | Rangan et al. |
| 6,157,413 A | 12/2000 | Hanafee et al. |
| 6,161,182 A | 12/2000 | Nadooshan |
| 6,166,778 A | 12/2000 | Yamamoto et al. |
| 6,167,235 A | 12/2000 | Sibecas et al. |
| 6,169,541 B1 | 1/2001 | Smith |
| 6,172,673 B1 | 1/2001 | Lehtinen et al. |
| 6,172,677 B1 | 1/2001 | Stautner et al. |
| 6,173,112 B1 * | 1/2001 | Gruse et al. ................. 386/291 |
| 6,177,931 B1 * | 1/2001 | Alexander et al. .............. 725/52 |
| 6,178,114 B1 | 1/2001 | Yang |
| 6,182,124 B1 | 1/2001 | Lau et al. |
| 6,195,501 B1 | 2/2001 | Perry |
| 6,198,511 B1 | 3/2001 | Matz et al. |
| 6,199,206 B1 | 3/2001 | Nishioka |
| 6,201,536 B1 | 3/2001 | Hendricks et al. |
| 6,201,538 B1 | 3/2001 | Wugofski |
| 6,215,483 B1 | 4/2001 | Zigmond |
| 6,215,783 B1 | 4/2001 | Neyman |
| 6,229,532 B1 | 5/2001 | Fujii |
| 6,229,541 B1 | 5/2001 | Kamen et al. |
| 6,240,555 B1 | 5/2001 | Shoff et al. |
| 6,243,713 B1 | 6/2001 | Nelson et al. |
| 6,243,741 B1 | 6/2001 | Utsumi |
| 6,252,629 B1 | 6/2001 | Takatori |
| 6,252,630 B1 | 6/2001 | Kusumi et al. |
| 6,253,204 B1 | 6/2001 | Glass et al. |
| 6,253,228 B1 | 6/2001 | Ferris |

(56) References Cited

U.S. PATENT DOCUMENTS

| | | |
|---|---|---|
| 6,256,071 B1 | 7/2001 | Hiroi |
| 6,256,785 B1 | 7/2001 | Klappert et al. |
| 6,260,192 B1 | 7/2001 | Rosin |
| 6,263,505 B1 | 7/2001 | Walker et al. |
| 6,266,814 B1 | 7/2001 | Lemmons et al. |
| 6,268,849 B1 | 7/2001 | Boyer |
| 6,271,893 B1 | 8/2001 | Kawaguchi et al. |
| 6,285,407 B1 | 9/2001 | Yasuki et al. |
| 6,286,005 B1 | 9/2001 | Cannon |
| 6,311,011 B1 | 10/2001 | Kuroda |
| 6,314,569 B1 | 11/2001 | Chernock et al. |
| 6,317,779 B1 | 11/2001 | Gile et al. |
| 6,317,780 B1 | 11/2001 | Cohn et al. |
| 6,317,881 B1 | 11/2001 | Shah-Nazaroff et al. |
| 6,317,885 B1 | 11/2001 | Fries |
| 6,335,736 B1 | 1/2002 | Wagner et al. |
| 6,344,878 B1 | 2/2002 | Emura |
| 6,348,932 B1 | 2/2002 | Nishikawa |
| 6,349,410 B1 | 2/2002 | Lortz |
| 6,351,270 B1 | 2/2002 | Nishikawa et al. |
| 6,357,042 B2 | 3/2002 | Srinivasan et al. |
| 6,366,907 B1 | 4/2002 | Fanning et al. |
| 6,367,080 B1 | 4/2002 | Enomoto |
| 6,373,503 B1 | 4/2002 | Perkes |
| 6,374,402 B1 * | 4/2002 | Schmeidler et al. .......... 717/167 |
| 6,374,404 B1 | 4/2002 | Brotz et al. |
| 6,374,406 B2 * | 4/2002 | Hirata ........................... 725/132 |
| 6,389,593 B1 | 5/2002 | Yamagishi |
| 6,393,430 B1 | 5/2002 | Van Ryzin |
| 6,397,261 B1 | 5/2002 | Eldridge |
| 6,400,407 B1 | 6/2002 | Zigmond et al. |
| 6,412,111 B1 | 6/2002 | Cato |
| 6,415,319 B1 | 7/2002 | Ambroziak |
| 6,415,438 B1 | 7/2002 | Blackketter et al. |
| 6,418,169 B1 | 7/2002 | Datari |
| 6,437,836 B1 | 8/2002 | Huang et al. |
| 6,442,593 B1 * | 8/2002 | Wang et al. ................... 709/206 |
| 6,442,755 B1 | 8/2002 | Lemmons et al. |
| 6,446,082 B1 | 9/2002 | Arita |
| 6,446,261 B1 | 9/2002 | Rosser |
| 6,446,262 B1 | 9/2002 | Malaure |
| 6,460,180 B1 | 10/2002 | Park et al. |
| 6,463,205 B1 | 10/2002 | Aschbrenner et al. |
| 6,473,751 B1 | 10/2002 | Nikolovska et al. |
| 6,473,903 B2 | 10/2002 | Balakrishnan et al. |
| 6,485,044 B1 | 11/2002 | Blake |
| 6,498,895 B2 | 12/2002 | Young et al. |
| 6,502,243 B1 | 12/2002 | Thomas |
| 6,504,990 B1 | 1/2003 | Abecassis |
| 6,510,557 B1 | 1/2003 | Thrift |
| 6,510,558 B1 | 1/2003 | Iinuma et al. |
| 6,512,551 B1 | 1/2003 | Lund |
| 6,522,342 B1 | 2/2003 | Gagnon et al. |
| 6,526,575 B1 | 2/2003 | McCoy et al. |
| 6,526,577 B1 | 2/2003 | Knudson et al. |
| 6,526,579 B2 | 2/2003 | Sato |
| 6,530,082 B1 | 3/2003 | Del Sesto et al. |
| 6,536,041 B1 | 3/2003 | Knudson et al. |
| 6,560,777 B2 | 5/2003 | Blackketter et al. |
| 6,564,248 B1 | 5/2003 | Budge et al. |
| 6,564,379 B1 | 5/2003 | Knudson et al. |
| 6,564,380 B1 | 5/2003 | Murphy |
| 6,571,392 B1 | 5/2003 | Zigmond et al. |
| 6,591,292 B1 | 7/2003 | Morrison et al. |
| 6,600,496 B1 | 7/2003 | Wagner et al. |
| 6,603,488 B2 * | 8/2003 | Humpleman et al. ........ 715/771 |
| 6,604,239 B1 | 8/2003 | Kohen |
| 6,604,242 B1 | 8/2003 | Weinstein et al. |
| 6,611,654 B1 | 8/2003 | Shteyn |
| 6,614,987 B1 | 9/2003 | Ismall et al. |
| 6,615,408 B1 | 9/2003 | Kaiser et al. |
| 6,631,413 B1 | 10/2003 | Aggarwal et al. |
| 6,631,523 B1 | 10/2003 | Matthews et al. |
| 6,636,890 B1 | 10/2003 | Mandalia |
| 6,637,029 B1 | 10/2003 | Maissal et al. |
| 6,647,417 B1 | 11/2003 | Hunter et al. |
| 6,662,007 B2 | 12/2003 | Yuen |
| 6,665,870 B1 * | 12/2003 | Finseth et al. .................. 725/40 |
| 6,668,378 B2 | 12/2003 | Leak et al. |
| 6,675,385 B1 | 1/2004 | Wang |
| 6,681,393 B1 | 1/2004 | Bauminger et al. |
| 6,698,020 B1 | 2/2004 | Zigmond et al. |
| 6,701,528 B1 | 3/2004 | Arsenault |
| 6,718,551 B1 | 4/2004 | Swix et al. |
| 6,721,954 B1 | 4/2004 | Nickum |
| 6,725,461 B1 | 4/2004 | Dougherty et al. |
| 6,732,158 B1 | 5/2004 | Hesselink et al. |
| 6,732,366 B1 | 5/2004 | Russo |
| 6,738,978 B1 | 5/2004 | Hendricks et al. |
| 6,745,245 B1 | 6/2004 | Carpenter |
| 6,745,368 B1 | 6/2004 | Boucher et al. |
| 6,751,800 B1 | 6/2004 | Fukuda et al. |
| 6,754,905 B2 | 6/2004 | Gordon et al. |
| 6,765,557 B1 * | 7/2004 | Segal et al. .................... 345/173 |
| 6,766,524 B1 | 7/2004 | Matheny et al. |
| 6,772,139 B1 | 8/2004 | Smith, III |
| 6,785,902 B1 | 8/2004 | Zigmond et al. |
| 6,792,615 B1 | 9/2004 | Rowe et al. |
| 6,792,618 B1 | 9/2004 | Bendinelli et al. |
| 6,799,326 B2 | 9/2004 | Boylan, III et al. |
| 6,804,528 B1 | 10/2004 | Laroia et al. |
| 6,813,776 B2 | 11/2004 | Chernock et al. |
| 6,816,904 B1 | 11/2004 | Ludwig et al. |
| 6,834,156 B1 | 12/2004 | Marko et al. |
| 6,886,178 B1 | 4/2005 | Mao et al. |
| 6,898,762 B2 | 5/2005 | Ellis et al. |
| 6,912,726 B1 | 6/2005 | Chen et al. |
| 6,928,652 B1 | 8/2005 | Goldman |
| 6,938,270 B2 | 8/2005 | Blackketter et al. |
| 6,956,833 B1 | 10/2005 | Yukie |
| 6,966,066 B1 | 11/2005 | Zigmond et al. |
| 6,968,364 B1 | 11/2005 | Wong et al. |
| 6,983,478 B1 | 1/2006 | Grauch et al. |
| 6,990,676 B1 | 1/2006 | Proehl et al. |
| 6,990,678 B2 | 1/2006 | Zigmond |
| 7,032,030 B1 | 4/2006 | Codignotto |
| 7,076,152 B1 | 7/2006 | Eguchi et al. |
| 7,099,952 B2 | 8/2006 | Wong |
| 7,103,904 B1 | 9/2006 | Blackketter et al. |
| 7,117,518 B1 | 10/2006 | Takahashi et al. |
| 7,139,723 B2 | 11/2006 | Conkwright et al. |
| 7,139,983 B2 | 11/2006 | Kelts |
| 7,155,735 B1 | 12/2006 | Ngo et al. |
| 7,165,098 B1 | 1/2007 | Boyer et al. |
| 7,165,266 B2 | 1/2007 | Zigmond |
| 7,167,895 B1 | 1/2007 | Connelly |
| 7,174,562 B1 | 2/2007 | Leak |
| 7,178,162 B2 | 2/2007 | Martinolich et al. |
| 7,181,756 B1 | 2/2007 | Zigmond et al. |
| 7,185,355 B1 | 2/2007 | Ellis et al. |
| 7,222,354 B1 | 5/2007 | Ching et al. |
| 7,224,886 B2 | 5/2007 | Akamatsu et al. |
| 7,229,354 B2 | 6/2007 | McNutt et al. |
| 7,272,298 B1 | 9/2007 | Lang et al. |
| 7,284,064 B1 | 10/2007 | Connelly |
| 7,287,267 B2 | 10/2007 | Knudson et al. |
| 7,296,282 B1 | 11/2007 | Koplar et al. |
| 7,305,692 B2 | 12/2007 | Blackketter et al. |
| 7,340,411 B2 | 3/2008 | Cook |
| 7,359,871 B1 | 4/2008 | Paasche et al. |
| 7,401,121 B2 | 7/2008 | Wong |
| 7,493,641 B2 | 2/2009 | Klosterman et al. |
| 7,516,203 B2 * | 4/2009 | Watanabe et al. ............. 709/223 |
| 7,543,323 B1 | 6/2009 | Zigmond et al. |
| 7,636,846 B1 | 12/2009 | Eskicioglu |
| 7,665,111 B1 | 2/2010 | Barton et al. |
| 7,673,315 B1 | 3/2010 | Wong et al. |
| 7,676,138 B2 | 3/2010 | Blackketter |
| 7,885,517 B2 | 2/2011 | Blackketter |
| 7,979,881 B1 | 7/2011 | Wong et al. |
| 8,316,389 B2 | 11/2012 | Wong et al. |
| 8,341,687 B2 | 12/2012 | Blackketter et al. |
| 2001/0001160 A1 | 5/2001 | Shoff et al. |
| 2001/0023430 A1 | 9/2001 | Srinivasan |

(56) References Cited

U.S. PATENT DOCUMENTS

| | | |
|---|---|---|
| 2001/0037303 A1 | 11/2001 | Mizrahi |
| 2002/0007493 A1 | 1/2002 | Butler et al. |
| 2002/0010926 A1 | 1/2002 | Lee |
| 2002/0026496 A1 | 2/2002 | Boyer et al. |
| 2002/0032903 A1 | 3/2002 | Sprunk |
| 2002/0042923 A1 | 4/2002 | Asmussen et al. |
| 2002/0046407 A1* | 4/2002 | Franco .................... 725/110 |
| 2002/0053077 A1 | 5/2002 | Shah-Nazaroff et al. |
| 2002/0056123 A1 | 5/2002 | Liwerant et al. |
| 2002/0087967 A1 | 7/2002 | Conkwright et al. |
| 2002/0092017 A1 | 7/2002 | Klosterman et al. |
| 2002/0095676 A1 | 7/2002 | Knee et al. |
| 2002/0100044 A1 | 7/2002 | Daniels |
| 2002/0104099 A1 | 8/2002 | Novak |
| 2002/0133816 A1 | 9/2002 | Greene et al. |
| 2002/0138840 A1 | 9/2002 | Schein et al. |
| 2002/0156660 A1 | 10/2002 | Nishimura et al. |
| 2002/0166120 A1 | 11/2002 | Boylan et al. |
| 2002/0194585 A1 | 12/2002 | Connelly |
| 2003/0005463 A1 | 1/2003 | Macrae et al. |
| 2003/0009770 A1 | 1/2003 | Tantawy et al. |
| 2003/0020744 A1 | 1/2003 | Ellis et al. |
| 2003/0031465 A1 | 2/2003 | Blake |
| 2003/0037333 A1 | 2/2003 | Ghashghai et al. |
| 2003/0040962 A1 | 2/2003 | Lewis |
| 2003/0044165 A1* | 3/2003 | Wood et al. ............. 386/83 |
| 2003/0066085 A1 | 4/2003 | Boyer et al. |
| 2003/0079231 A1* | 4/2003 | Hirata .................... 725/105 |
| 2003/0093792 A1 | 5/2003 | Labeeb et al. |
| 2003/0095791 A1 | 5/2003 | Barton et al. |
| 2003/0149980 A1 | 8/2003 | Hassell et al. |
| 2003/0149988 A1 | 8/2003 | Ellis et al. |
| 2003/0154486 A1 | 8/2003 | Dunn et al. |
| 2003/0198461 A1 | 10/2003 | Taylor et al. |
| 2004/0002156 A1 | 1/2004 | Greener et al. |
| 2004/0019903 A1 | 1/2004 | Knudson et al. |
| 2004/0040042 A1 | 2/2004 | Feinleib |
| 2004/0078817 A1 | 4/2004 | Horowitz et al. |
| 2004/0109675 A1 | 6/2004 | Tsukidate |
| 2004/0117831 A1 | 6/2004 | Ellis et al. |
| 2004/0123323 A1 | 6/2004 | Russo |
| 2004/0205810 A1 | 10/2004 | Matheny et al. |
| 2004/0205829 A1 | 10/2004 | Hane |
| 2004/0210932 A1 | 10/2004 | Mori et al. |
| 2004/0237119 A1 | 11/2004 | Smith |
| 2004/0261130 A1 | 12/2004 | Leak et al. |
| 2005/0028206 A1 | 2/2005 | Cameron et al. |
| 2005/0028208 A1 | 2/2005 | Ellis et al. |
| 2005/0044571 A1 | 2/2005 | Goldman |
| 2005/0066353 A1* | 3/2005 | Fransdonk ............. 725/29 |
| 2005/0091493 A1 | 4/2005 | Hirata |
| 2005/0097594 A1 | 5/2005 | O'Donnell et al. |
| 2005/0149964 A1 | 7/2005 | Thomas et al. |
| 2005/0155056 A1 | 7/2005 | Knee et al. |
| 2005/0160283 A1* | 7/2005 | Hirata .................... 713/189 |
| 2005/0172231 A1 | 8/2005 | Myers |
| 2005/0204388 A1 | 9/2005 | Knudson et al. |
| 2005/0251827 A1 | 11/2005 | Ellis et al. |
| 2005/0273819 A1* | 12/2005 | Knudson et al. .......... 725/58 |
| 2005/0278714 A1 | 12/2005 | Vahid et al. |
| 2005/0278741 A1 | 12/2005 | Robarts et al. |
| 2006/0015893 A1 | 1/2006 | Kitsukawa et al. |
| 2006/0031405 A1 | 2/2006 | Goldman et al. |
| 2006/0031883 A1* | 2/2006 | Ellis et al. ............. 725/58 |
| 2006/0041921 A1 | 2/2006 | Hane |
| 2006/0190966 A1 | 8/2006 | McKissick et al. |
| 2007/0094690 A1 | 4/2007 | Rodriguez et al. |
| 2007/0107030 A1 | 5/2007 | Zigmond |
| 2007/0136753 A1 | 6/2007 | Bovenschulte et al. |
| 2007/0277201 A1 | 11/2007 | Wong et al. |
| 2009/0158374 A1 | 6/2009 | Malaure et al. |
| 2010/0107194 A1 | 4/2010 | McKissick et al. |
| 2011/0013885 A1 | 1/2011 | Wong et al. |

FOREIGN PATENT DOCUMENTS

| | | |
|---|---|---|
| EP | 1298923 | 4/2003 |
| GB | 2338364 | 12/1999 |
| JP | 2003022377 | 1/2003 |
| JP | 2003339041 | 11/2003 |
| JP | 2004064184 | 2/2004 |
| JP | 2004180088 | 6/2004 |
| RU | 2368094 | 9/2009 |
| WO | WO 92/22983 | 12/1992 |
| WO | WO-9222983 | 12/1992 |
| WO | WO-9722207 | 6/1997 |
| WO | WO-9750251 | 12/1997 |
| WO | WO-9816062 | 4/1998 |
| WO | WO-9817064 | 4/1998 |
| WO | WO-9826584 | 6/1998 |
| WO | WO-9841020 | 9/1998 |
| WO | WO-9853611 | 11/1998 |
| WO | WO-9901984 | 1/1999 |
| WO | WO 99/38321 | 7/1999 |
| WO | WO-9938321 | 7/1999 |
| WO | WO-0004709 | 1/2000 |
| WO | WO-0101270 | 1/2001 |
| WO | WO-0137549 | 5/2001 |

OTHER PUBLICATIONS

"Non Final Office Action", U.S. Appl. No. 11/15,676, (Jun. 11, 2009),9 pgaes.

"Advanced Television Enhancement Forum Specification (ATVEF)", Comment draft Version 1.0, Revision 1, Aug. 1998, 19 pages.

"Advanced Television Enhancement Forum Specification (ATVEF)", Draft Version 1.1, Revision 19, Aug. 1998, 32 pages.

"Advanced Television Enhancement Forum Specification (ATVEF)", Version 1.1 revision 26, Feb. 2, 1999, 37 pages.

"Advisory Action", U.S. Appl. No. 09/441,708, Apr. 27, 2005, 3 pages.

"Advisory Action", U.S. Appl. No. 09/441,708, Dec. 27, 2005, 3 pages.

"Advisory Action", U.S. Appl. No. 09/649,788, Apr. 21, 2006, 4 pages.

"Advisory Action", U.S. Appl. No. 09/650,167, Jun. 28, 2004, 4 pages.

"Advisory Action", U.S. Appl. No. 09/650,352, Aug. 23, 2005, 3 pages.

"Advisory Action", U.S. Appl. No. 09/650,352, Nov. 24, 2008, 3 pages.

"Advisory Action", U.S. Appl. No. 09/650,375, May 5, 2005, 3 pages.

"Advisory Action", U.S. Appl. No. 09/650,375, Oct. 12, 2007, 3 pages.

"Advisory Action", U.S. Appl. No. 09/650,481, Feb. 26, 2008, 3 pages.

"Advisory Action", U.S. Appl. No. 09/650,481, Jul. 14, 2004, 3 pages.

"Advisory Action", U.S. Appl. No. 09/894,327, Dec. 29, 2005, 3 pages.

"Advisory Action", U.S. Appl. No. 11/115,669, Apr. 14, 2010, 4 pages.

"Advisory Action", U.S. Appl. No. 11/115,670, Sep. 11, 2008, 3 pages.

"BPAI Decision", U.S. Appl. No. 10/891,579, Jan. 13, 2014, 9 pages.
"ClickReward, it all adds up", Netcentives Press Identified as p. http.www.netcentives.com/clickrewards/index.html, 1997, 3 pages.
"Creating Interactive Television Links", http://developer.webtv.net/itv/links/main.htm, Jun. 9, 1999, 7 pages.
"Decision on Appeal", U.S. Appl. No. 09/650,481, Apr. 19, 2007, 9 pages.
"Displaying Television Broadcasts in Web Pages", http://developer.erbtv.net/itv/embedtv.main.htm, Jun. 9, 1999, 4 pages.
"ECMA—European Association for Standardizing Information and Communication Systems", Standard ECMA—262, 2nd Edition, Aug. 1998, 108 pages.

(56) References Cited

OTHER PUBLICATIONS

"Examiner's Answer to Appeal Brief", U.S. Appl. No. 09/650,375, Nov. 3, 2006, 31 pages.
"Examiner's Answer to Appeal Brief", U.S. Appl. No. 09/650,375, Jun. 15, 2006, 32 pages.
"Examiner's Answer to Appeal Brief", U.S. Appl. No. 09/650,481, Jan. 27, 2005, 10 pages.
"Final Office Action", U.S. Appl. No. 09/087,354, Jan. 31, 2002, 11 pages.
"Final Office Action", U.S. Appl. No. 09/087,354, May 5, 2004, 11 pages.
"Final Office Action", U.S. Appl. No. 09/087,354, Jun. 19, 2003, 13 pages.
"Final Office Action", U.S. Appl. No. 09/287,985, Apr. 21, 2003, 11 pages.
"Final Office Action", U.S. Appl. No. 09/295,746, Jul. 18, 2001, 10 pages.
"Final Office Action", U.S. Appl. No. 09/345,223, Oct. 20, 2005, 10 pages.
"Final Office Action", U.S. Appl. No. 09/345,223, Nov. 21, 2003, 8 pages.
"Final Office Action", U.S. Appl. No. 09/412,839, Jul. 18, 2001, 10 pages.
"Final Office Action", U.S. Appl. No. 09/441,708, Jul. 13, 2006, 6 pages.
"Final Office Action", U.S. Appl. No. 09/441,708, Oct. 28, 2005, 6 pages.
"Final Office Action", U.S. Appl. No. 09/441,708, Dec. 17, 2004, 9 pages.
"Final Office Action", U.S. Appl. No. 09/467,851, Jan. 31, 2006, 14 pages.
"Final Office Action", U.S. Appl. No. 09/467,851, Apr. 20, 2005, 9 pages.
"Final Office Action", U.S. Appl. No. 09/566,695, Oct. 27, 2003, 15 pages.
"Final Office Action", U.S. Appl. No. 09/649,788, Feb. 3, 2006, 35 pages.
"Final Office Action", U.S. Appl. No. 09/649,788, Apr. 8, 2005, 26 pages.
"Final Office Action", U.S. Appl. No. 09/650,167, Apr. 5, 2004, 18 pages.
"Final Office Action", U.S. Appl. No. 09/650,352, Jun. 2, 2005, 20 pages.
"Final Office Action", U.S. Appl. No. 09/650,352, Sep. 26, 2008, 17 pages.
"Final Office Action", U.S. Appl. No. 09/650,375, Feb. 10, 2005, 28 pages.
"Final Office Action", U.S. Appl. No. 09/650,375, Mar. 11, 2009, 32 pages.
"Final Office Action", U.S. Appl. No. 09/650,375, Jul. 19, 2007, 31 pages.
"Final Office Action", U.S. Appl. No. 09/650,481, Jan. 8, 2009, 9 pages.
"Final Office Action", U.S. Appl. No. 09/650,481, Mar. 18, 2010, 9 pages.
"Final Office Action", U.S. Appl. No. 09/650,481, May 10, 2004, 8 pages.
"Final Office Action", U.S. Appl. No. 09/650,481, Dec. 14, 2007, 9 pages.
"Final Office Action", U.S. Appl. No. 09/894,327, Oct. 19, 2005, 6 pages.
"Final Office Action", U.S. Appl. No. 10/835,196, Jul. 9, 2008, 14 pages.
"Final Office Action", U.S. Appl. No. 10/835,196, Aug. 31, 2009, 17 pages.
"Final Office Action", U.S. Appl. No. 10/918,864, Feb. 17, 2010, 10 pages.
"Final Office Action", U.S. Appl. No. 10/918,864, May 13, 2008, 10 pages.
"Final Office Action", U.S. Appl. No. 11/093,666, Jan. 20, 2010, 29 pages.
"Final Office Action", U.S. Appl. No. 11/093,666, Feb. 4, 2009, 16 pages.
"Final Office Action", U.S. Appl. No. 11/115,669, Feb. 5, 2010, 8 pages.
"Final Office Action", U.S. Appl. No. 11/115,669, Oct. 15, 2010, 15 pages.
"Final Office Action", U.S. Appl. No. 11/115,670, May 1, 2008, 10 pages.
"Final Office Action", U.S. Appl. No. 11/177,724, Jun. 9, 2009, 12 pages.
"Final Office Action", U.S. Appl. No. 11/614,759, Aug. 5, 2009, 11 pages.
"Final Office Action", U.S. Appl. No. 11/836,451, May 5, 2010, 9 pages.
"Final Office Action", U.S. Appl. No. 11/836,451, Aug. 17, 2011, 10 pages.
"Final Office Action", U.S. Appl. No. 12/684,763, Apr. 18, 2012, 26 pages.
"Foreign Office Action", CA Application No. 2,508,652, Jul. 31, 2013, 2 Pages.
"Foreign Notice of Allowance", JP Application No. 2007-521446, Jan. 10, 2012, 6 pages.
"Foreign Office Action", CA Application No. 2,508,652, Jan. 30, 2014, 6 Pages.
"Foreign Office Action", CA Application No. 2,508,652, May 16, 2012, 5 pages.
"Foreign Office Action", EP Application No. 04786621.5, Apr. 25, 2012, 4 pages.
"Foreign Office Action", EP Application No. 04786621.5, Jun. 20, 2011, 5 pages.
"Foreign Office Action", JP Application No. 2007-521446, Jan. 21, 2011, 7 pages.
"Foreign Office Action", JP Application No. 2007-521446, Oct. 21, 2011, 3 pages.
"Foreign Office Action", JP Application No. 2007-521446, Aug. 17, 2010, 6 pages.
"Foreign Office Action", KR Application No. 10-2005-7012341, Nov. 1, 2011, 14 pages.
"Foreign Office Action", KR Application No. 10-2005-7012341, Feb. 9, 2011, 19 pages.
"Foreign Office Action", MX Application No. PA/a/2005/007149, Jan. 29, 2010, 4 pages.
"How Does it Work", Intel Intercast Website www.intercast.com, Jan. 29, 1999, 5 pages.
"How the Internet Works", Preston Gralla, Special Edition, 1997, pp. 66, 67, 142, 143, 150, 151, 260, 261, 278, 279.
"HTML 4.0 Specification", W3c, Identified as p. http://www.w3org/TR/TEC-html40.txt, 1997, 209 pages.
"International Search Report", Application No. PCT/US00/31438, May 6, 2001, 4 pages.
"International Search Report", Application No. PCT/US99/16141, Oct. 14, 1999, 3 pages.
"Internet Protocol, DARPA Internet Protocol Specification", Request for Comments (RFC) 791, Sep. 1981, 44 pages.
"Joint EIA/CVCC Recommended Practice for Teletext North American Basic Teletext Specification (NABTS)", Electronic Industries Association EIA—516, May 1988, 86 pages.
"MbTV Your Thumbprint on TV, Metabyte TV", http://www.mbtv.com.index.htm, Jul. 20, 2000, 12 pages.
"Microsoft Computer Dictionary 4th Edition, p. 444", Microsoft Press, 1999, 6 pages.
"NDS the Company, Website Home Page", http://www.nds.com/news/pressroom.htm, Jul. 20, 2000, 9 pages.
"Netcentives Launches Global Incentive Program", Netcentives Press Identified as pp. http://www.netcentives.com/press/archive/NC19991021a.html., Oct. 25, 1999, 2 pages.
"Non Final Office Action", U.S. Appl. No. 09/087,354, May 9, 2001, 5 pages.
"Non Final Office Action", U.S. Appl. No. 09/087,354, Dec. 8, 2003, 8 pages.

(56) References Cited

OTHER PUBLICATIONS

"Non Final Office Action", U.S. Appl. No. 09/087,354, Dec. 17, 2002, 11 pages.
"Non Final Office Action", U.S. Appl. No. 09/099,481, Apr. 12, 2000, 8 pages.
"Non Final Office Action", U.S. Appl. No. 09/287,985, Mar. 29, 2004, 10 pages.
"Non Final Office Action", U.S. Appl. No. 09/287,985, Aug. 14, 2002, 10 pages.
"Non Final Office Action", U.S. Appl. No. 09/287,985, Sep. 25, 2003, 11 pages.
"Non Final Office Action", U.S. Appl. No. 09/295,436, Jul. 5, 2002, 12 pages.
"Non Final Office Action", U.S. Appl. No. 09/295,746, Dec. 6, 2000, 9 pages.
"Non Final Office Action", U.S. Appl. No. 09/345,223, May 9, 2003, 9 pages.
"Non Final Office Action", U.S. Appl. No. 09/345,223, Jun. 3, 2004, 9 pages.
"Non Final Office Action", U.S. Appl. No. 09/345,247, Dec. 19, 2002, 12 pages.
"Non Final Office Action", U.S. Appl. No. 09/412,839, Nov. 22, 2000, 9 pages.
"Non Final Office Action", U.S. Appl. No. 09/467,851, Mar. 29, 2004, 9 pages.
"Non Final Office Action", U.S. Appl. No. 09/467,851, Jul. 3, 2006, 7 pages.
"Non Final Office Action", U.S. Appl. No. 09/467,851, Jul. 8, 2004, 7 pages.
"Non Final Office Action", U.S. Appl. No. 09/467,851, Aug. 12, 2005, 13 pages.
"Non Final Office Action", U.S. Appl. No. 09/566,695, Apr. 10, 2003, 25 pages.
"Non Final Office Action", U.S. Appl. No. 09/649,788, Aug. 4, 2004, 24 pages.
"Non Final Office Action", U.S. Appl. No. 09/649,788, Aug. 9, 2005, 30 pages.
"Non Final Office Action", U.S. Appl. No. 09/649,788, Oct. 27, 2006, 30 pages.
"Non Final Office Action", U.S. Appl. No. 09/650,167, Nov. 4, 2003, 16 pages.
"Non Final Office Action", U.S. Appl. No. 09/650,167, Nov. 10, 2004, 15 pages.
"Non Final Office Action", U.S. Appl. No. 09/650,352, Mar. 5, 2009, 18 pages.
"Non Final Office Action", U.S. Appl. No. 09/650,352, Apr. 28, 2010, 20 pages.
"Non Final Office Action", U.S. Appl. No. 09/650,352, Apr. 29, 2008, 16 pages.
"Non Final Office Action", U.S. Appl. No. 09/650,352, Sep. 8, 2004, 17 pages.
"Non Final Office Action", U.S. Appl. No. 09/650,352, Oct. 6, 2009, 19 pages.
"Non Final Office Action", U.S. Appl. No. 09/650,352, Nov. 1, 2007, 21 pages.
"Non Final Office Action", U.S. Appl. No. 09/650,375, Feb. 14, 2007, 36 pages.
"Non Final Office Action", U.S. Appl. No. 09/650,375, Jul. 30, 2004, 25 pages.
"Non Final Office Action", U.S. Appl. No. 09/650,375, Dec. 13, 2007, 37 pages.
"Non Final Office Action", U.S. Appl. No. 09/650,481, Jun. 26, 2007, 10 pages.
"Non Final Office Action", U.S. Appl. No. 09/650,481, Jul. 17, 2008, 8 pages.
"Non Final Office Action", U.S. Appl. No. 09/650,481, Sep. 12, 2003, 7 pages.
"Non Final Office Action", U.S. Appl. No. 09/650,481, Sep. 23, 2009, 9 pages.
"Non Final Office Action", U.S. Appl. No. 09/788,985, Feb. 13, 2004, 10 pages.
"Non Final Office Action", U.S. Appl. No. 09/788,985, Nov. 17, 2004, 10 pages.
"Non Final Office Action", U.S. Appl. No. 09/894,327, Jun. 24, 2005, 6 pages.
"Non Final Office Action", U.S. Appl. No. 10/835,196, Oct. 22, 2007, 13 pages.
"Non Final Office Action", U.S. Appl. No. 10/835,196, Dec. 24, 2008, 13 pages.
"Non Final Office Action", U.S. Appl. No. 10/893,518, Jun. 19, 2008, 8 pages.
"Non Final Office Action", U.S. Appl. No. 10/893,518, Dec. 13, 2007, 11 pages.
"Non Final Office Action", U.S. Appl. No. 10/918,864, Jan. 21, 2009, 8 pages.
"Non Final Office Action", U.S. Appl. No. 10/918,864, Oct. 16, 2007, 8 pages.
"Non Final Office Action", U.S. Appl. No. 11/093,666, Jul. 21, 2009, 28 pages.
"Non Final Office Action", U.S. Appl. No. 11/093,666, Aug. 5, 2008, 6 pages.
"Non Final Office Action", U.S. Appl. No. 11/115,676, Jun. 11, 2009, 7 pages.
"Non Final Office Action", U.S. Appl. No. 11/177,724, Sep. 18, 2008, 10 pages.
"Non Final Office Action", U.S. Appl. No. 11/464,081, Jun. 22, 2007, 5 pages.
"Non Final Office Action", U.S. Appl. No. 11/464,081, Dec. 11, 2007, 6 pages.
"Non Final Office Action", U.S. Appl. No. 11/614,759, Dec. 30, 2008, 15 pages.
"Non Final Office Action", U.S. Appl. No. 11/836,451, Feb. 14, 2011, 8 pages.
"Non Final Office Action", U.S. Appl. No. 11/836,451, Dec. 24, 2009, 8 pages.
"Non Final Office Action", U.S. Appl. No. 11/836,451, Feb. 27, 2012, 5 pages.
"Non Final Office Action", U.S. Appl. No. 12/951,974, Jun. 28, 2012, 27 pages.
"Non-Final Office Action", U.S. Appl. No. 09/441,708, Feb. 9, 2006, 7 pages.
"Non-Final Office Action", U.S. Appl. No. 09/441,708, Apr. 19, 2004, 6 pages.
"Non-Final Office Action", U.S. Appl. No. 09/441,708, Jun. 16, 2005, 5 pages.
"Non-Final Office Action", U.S. Appl. No. 09/441,708, Nov. 6, 2003, 7 pages.
"Non-Final Office Action", U.S. Appl. No. 11/115,669, Sep. 17, 2009, 9 pages.
"Non-Final Office Action", U.S. Appl. No. 11/115,669, Nov. 24, 2008, 7 pages.
"Non-Final Office Action", U.S. Appl. No. 11/115,669, Jun. 3, 2010, 12 pages.
"Non-Final Office Action", U.S. Appl. No. 11/115,670, Mar. 30, 2007, 11 pages.
"Non-Final Office Action", U.S. Appl. No. 11/115,676, Dec. 26, 2008, 9 pages.
"Non-Final Office Action", U.S. Appl. No. 11/115,719, Apr. 20, 2007, 7 pages.
"Non-Final Office Action", U.S. Appl. No. 11/115,719, Apr. 21, 2006, 7 pages.
"Non-Final Office Action", U.S. Appl. No. 12/684,763, Oct. 13, 2011, 17 pages.
"Notice of Allowance", Application No. 09/087,354, Jul. 13, 2004, 5 pages.
"Notice of Allowance", Application No. 09/099,481, Sep. 11, 2000, 7 pages.
"Notice of Allowance", Application No. 09/287,985, Mar. 2, 2005, 4 pages.
"Notice of Allowance", Application No. 09/295,436, Jan. 15, 2003, 12 pages.

(56) References Cited

OTHER PUBLICATIONS

"Notice of Allowance", Application No. 09/295,746, May 21, 2002, 3 pages.
"Notice of Allowance", U.S. Appl. No. 09/345,223, Jun. 14, 2006, 6 pages.
"Notice of Allowance", U.S. Appl. No. 09/345,247, Jun. 4, 2003, 6 pages.
"Notice of Allowance", U.S. Appl. No. 09/412,839, Feb. 25, 2002, 7 pages.
"Notice of Allowance", U.S. Appl. No. 09/441,708, Sep. 18, 2006, 4 pages.
"Notice of Allowance", U.S. Appl. No. 09/467,851, Oct. 10, 2006, 7 pages.
"Notice of Allowance", U.S. Appl. No. 09/566,695, Mar. 10, 2004, 8 pages.
"Notice of Allowance", U.S. Appl. No. 09/650,167, Jun. 2, 2005, 7 pages.
"Notice of Allowance", U.S. Appl. No. 09/650,375, Oct. 29, 2008, 14 pages.
"Notice of Allowance", U.S. Appl. No. 09/650,481, Mar. 4, 2011, 8 pages.
"Notice of Allowance", U.S. Appl. No. 09/788,985, Jun. 17, 2005, 6 pages.
"Notice of Allowance", U.S. Appl. No. 09/894,327, May 23, 2006, 8 pages.
"Notice of Allowance", U.S. Appl. No. 10/835,196, Sep. 2, 2010, 10 pages.
"Notice of Allowance", U.S. Appl. No. 10/893,518, Jan. 8, 2009, 7 pages.
"Notice of Allowance", U.S. Appl. No. 10/893,518, Apr. 30, 2009, 7 pages.
"Notice of Allowance", U.S. Appl. No. 11/093,666, Aug. 31, 2012, 10 pages.
"Notice of Allowance", U.S. Appl. No. 11/115,669, Nov. 30, 2010, 4 pages.
"Notice of Allowance", U.S. Appl. No. 11/115,676, Dec. 4, 2009, 8 pages.
"Notice of Allowance", U.S. Appl. No. 11/115,719, Oct. 10, 2007, 9 pages.
"Notice of Allowance", U.S. Appl. No. 11/216,250, Oct. 31, 2006, 7 pages.
"Notice of Allowance", U.S. Appl. No. 11/464,081, Apr. 21, 2008, 6 pages.
"Notice of Allowance", U.S. Appl. No. 11/614,759, Mar. 22, 2010, 12 pages.
"Notice of Allowance", U.S. Appl. No. 11/614,759, Jun. 5, 2007, 4 pages.
"Notice of Allowance", U.S. Appl. No. 11/614,759, Dec. 31, 2009, 6 pages.
"Notice of Allowance", U.S. Appl. No. 11/836,451, Jul. 16, 2012, 7 pages.
"Press Room, Replay TV", http://www.replaytv.com/news/pressroom.htm, Jul. 20, 2000, 3 pages.
"Recommended Practice for Line 21 Data Service", Electronic Industries Association EIA-608, Sep. 1994, 132 pages.
"ReplayTV, Inc.", Press Release—http://www.replaytv.com/news/pressrelease18htm, Aug. 10, 2000, pp. 1-4.
"Research Disclosure #385002", Kenneth Mason Publications Ltd, Electronic Program Guide Via Internet,May 1996, 2 pages.
"Restriction Requirement", U.S. Appl. No. 09/441,708, Aug. 11, 2003, 5 pages.
"Restriction Requirement", U.S. Appl. No. 09/649,788, Apr. 10, 2007, 4 pages.
"Restriction Requirement", U.S. Appl. No. 09/650,375, Dec. 24, 2008, 7 pages.
"Restriction Requirement", U.S. Appl. No. 11/115,719, Jan. 10, 2007, 4 pages.
"Restriction Requirement", U.S. Appl. No. 11/115,719, Sep. 26, 2006, 5 pages.
"Supplemental Notice of Allowability", U.S. Appl. No. 09/087,354, Mar. 10, 2005, 4 pages.
"Supplemental Notice of Allowance", U.S. Appl. No. 09/650,167, Jun. 10, 2005, 4 pages.
"TiVo, Inc., Press Release", http://www.tivo.com/.about/061400.html, Jul. 20, 2000, 10 pages.
"Transport of Internet Uniform Resource Locator (URL) Information using Text-2 (T-2) Service", Electronic Industries Association EIA-746A, Sep. 1998, 16 pages.
"W3C Document Object Model (DOM) Level 1 Specification", identified as p. http://www.w3.org/TR/1998/REC-DOM-Level-1-19981001/DOM.txt, Oct. 1998, 113 pages.
"WebTV Networks Introduces Its Revolutionary Next-Generation System-Web TV Plus", Network Computing News—www.ncns.com, Sep. 16, 1997, 5 pages.
Bryant, "The Liberate Technologies TV Navigator for DTV: A Thin Web-Centric Client for Digital Television", Printed and Published by the IEE, Savoy Place, London, 1999, 7 pages.
Davenport, "WebTV Plus.. Is it Worth an Upgrade?", Net4tv www.net-4tv.com, Apr. 1, 1998, 9 pages.
Deering, "Host Extensions for IP Multicasting", Network Working Group, Stanford University, Aug. 1989, 18 pages.
Gifford, "Teletext Decoder", Radio-Electronics, Apr. 1996, pp. 45-49.
Hause, "Digital Video Recorders—The Next Big Thing?", Abstract, International Data Corporation, Report No. 19588, Jul. 1999, 20 pages.
Jones, "The Microsoft Interactive TV System", An Experience Report, Jul. 1997, 21 pages.
Lewis, "Boom Box", http://www.nytimes.com/library/magazine/home/2000813mag-boombox.html, Aug. 14, 2000, 16 pages.
Morris, "ZDNet: Hits and Hype, ZDNet Reviews", http://www.zdnet.com/products/stories/reviews/0,4161,2619461,99.html, Oct. 9, 2000, 3 pages.
Ng, "MPEG Transmission Schemes for a Timed Token Medium Access Control Network", ACM SIGCOMM Computer Communication Review vol. 29—No. 1., Jan. 1999, pp. 66-80.
Panabaker, et al.,' "The Transmission of IP Over the Vertical Blanking Interval of a Television Signal", Philips Semiconductors, WebTV Networks, Feb. 1999, 18 pages.
Postel, "User Datagram Protocol", Identified as p. ftp://ftp.isi.edu/in-notes/rfc768.txt, Aug. 1980, 3 pages.
Tetsuya, et al.,' "A Single-Chip MPEG-2 422P@ML Video, Audio, and System Encoder with a 162 MHz Media-Processor Core and Dual Motion Estimation Cores", IEICE Trans. Electron. vol. E84-C—No. 1, Jan. 2001, pp. 108-122.
Webster, "Merriam Webster's Cataloging Dictionary 10th Edition, p. 1240", 1998, 4 pages.
Zigmond, "Uniform Resource for Television Broadcast", Network Working Group, WebTV Networks, Jun. 1997, 3 pages.
Zigmond, "Uniform Resource Locators for Television and Telephony", Network Working Group, Wink Communications, Oct. 1996, 5 pages.
"Foreign Notice of Allowance", CA Application No. 2,508,652, Aug. 22, 2014, 1 Page.
"Non-Final Office Action", U.S. Appl. No. 13/681,360, Oct. 15, 2014, 7 Pages.

\* cited by examiner

CONTENT RECORDATION TECHNIQUES

TECHNICAL FIELD

The present invention generally relates to the field of content and in particular to content recordation techniques.

BACKGROUND

Users are continually exposed to an ever increasing variety of clients that provide network access, such a set-top boxes, wireless phones, computers, and so on. A user of a set-top box, for instance, may view traditional television programming obtained from a broadcast network for display on a television, as well as order pay-per-view movies, receive video-on-demand (VOD), play "live" video games, and so on. Likewise, a user of a wireless phone may place and receive traditional telephone calls, as well as read email, download digital music, and so on.

Another such example is a digital video recorder (DVR). A DVR typically includes non-volatile storage (e.g., a hard disk) that enables the user to record desired content. DVR's also offer control functionality, such as the ability to pause content that is currently being broadcast and allows viewers to watch the content, while still in progress, from the point it was paused. The DVR plays back the content from storage, starting at the pause event, while continuing to record the currently-broadcast content. Additionally, the DVR may support other control functions, such as rewinding, fast forwarding a stored program, slow motion playback, and the like.

To record content using a DVR, a user was typically required to directly interact with the DVR itself. In some instances, the user could configure the DVR to record related content by specifying parameters to be matched with those of available content to locate potentially desirable content. For example, the user could specify the title of a television program so that the DVR would record each television program having that title. However, the user was not assured that the DVR would record a particular content item of interest. In other words, the user could not be certain that the potentially desirable content recorded by the DVR corresponded with the actual content the user wished to record. For example, although the DVR may be configured to record a particular television program, the DVR might fail to record a special regarding the actors in that particular television program. Therefore, when the user was located "away" from the DVR, the user could not cause the DVR to record the particular content item, even if the user had access to one or more of the clients that provide network access as previously described.

Accordingly, there is a continuing need for improved content recordation techniques.

SUMMARY

Content recordation techniques are described. The content recordation techniques may be utilized when the user is local to and remote from the client. For example, a user, when remotely located from a client configured as a digital video recorder (DVR), interacts with a remote device that is configured as a wireless phone. The user utilizes the wireless phone to access a review of a television program via the Internet. Based on the review, the user invokes a recording document that is embedded in the review to be communicated to the remote client. The recording document describes the television program, such as by describing a title, actors, broadcast time, service (e.g., channel) that broadcasts the television program, and so on.

Upon receipt of the recording document, the remote client executes a parser module to examine the recording document to determine if the television program described in the recording document is available for being recorded by the remote client. For instance, the recording document may be compared with electronic program guide (EPG) data that is received from a head end, EPG data service, and so on. The EPG data may be utilized to determine if the television program is available. The EPG data may also be utilized to determine how the television program is to be recorded, such as by supplying a channel and broadcast start time. If the television program is available, a reference to the television program is added to a recording list based on the EPG data. For example, the broadcast channel and the broadcast start time may be added to the recording list. The recording list is then utilized by the remote client to cause the client to record the content. In another instance, the recording document may cause the head end to cause the client to record the content, such as by examining EPG data stored at the head end to determine if the content is available for recording. If so, the head end causes the client the record the content. In a further instance, the recording document may cause the head end itself to record the content, such as in a network digital video recorder (NDVR) scenario.

BRIEF DESCRIPTION OF THE DRAWINGS

The same reference numbers are utilized in instances in the discussion to reference like structures and components.

DETAILED DESCRIPTION

Overview

Content recordation techniques are described. In an implementation, a content recordation technique is described in which a client, such as a digital video recorder (DVR), is configured to record content streamed from a head end through use of a recording document that describes the content. The recording document may be provided in a variety of ways, such as embedded in a web site, shared via email or text messaging, submitted via an application programming interface (API), manually written by a user, and so on. The recording document is processed via a parser module to locate the content item that is described by the recording document. In one scenario, the parser module compares the recording document with an electronic program guide (EPG) that is stored on the client to find a matching content item that is described in the EPG data. If a sufficient match is found, a reference to the matching content item is added to a recording list based on the EPG data, such as a broadcast channel and time to record the matching content item. In another scenario, the head end processes the recording document provided by a remote device to determine whether the described content item is available. If so, the head end then causes the client to record the particular content item, such as through communication of a recording list to the client. Thus, a user may cause a particular content item to be recorded without direct interaction with the client.

In a further implementation, the head end stores client state data to process content recordation requests. For example, the head end may include client state data, such as ratings limits, favorite channels, levels of service, and so on, that is accessible locally by the head end. The head end may utilize this client state data to determine if the client is permitted to access the content item described by the recording document. If so, the head end may then cause the client to record the content. By performing the determination utilizing client state data at the head end, the head end provides an authoritative source for processing requests to record content by the client. This may result in a variety of increased functionality that is available to the user, such as an ability to change from an old client to a new client without manually updating client state data from the old client to the new client, remote initiation of content recordation without obtaining a connection with the client itself, and so on.

Exemplary Environment

Figure 1:
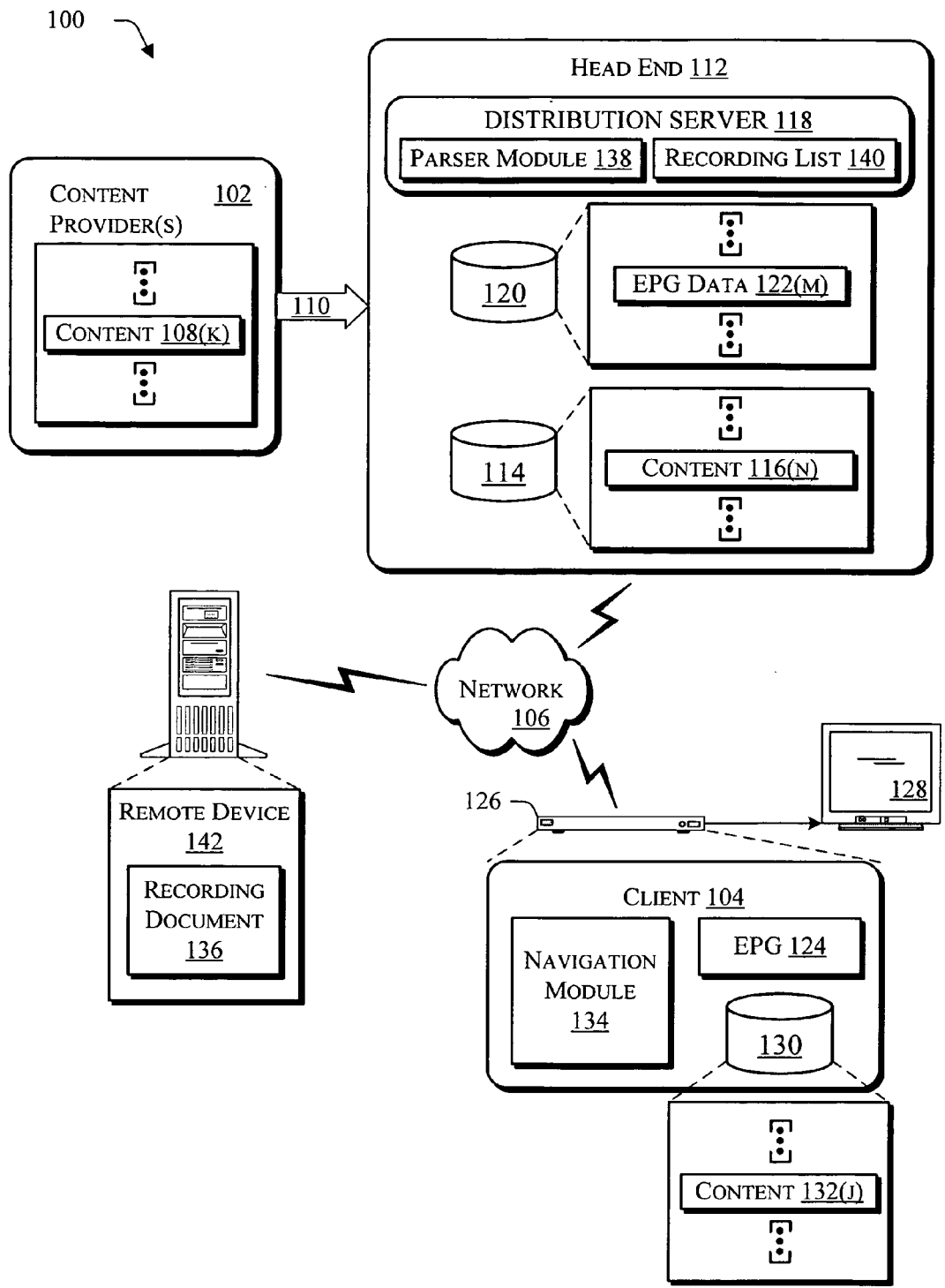
FIG. 1 is an illustration of an environment in an exemplary implementation that includes a content provider that is communicatively coupled to a client over a network.

FIG. 1 is an illustration of an environment 100 in an exemplary implementation showing a content provider 102 that is communicatively coupled to a client 104 over a network 106. The network 106 in the following implementations is an example of a wide area network (WAN), such as the Internet, and may also include a variety of other networks, such as a broadcast network, an intranet, a wired or wireless network, and so forth.

The client 104 is configured to receive content communicated from the content provider 102 over the network 106. The content provider 102 includes content 108(k), where "k" can be any integer from 1 to "K", that is locally stored on the content provider 102. The content 108(k) may include a variety of data, such as television programming, video-on-demand, one or more results of remote application processing, and so on. The content provider 102 communicates the content 108(k) over a network 110 to a head end 112. The network 110 may be the same as or different from network 106. For example, the network 110 may represent a dedicated network connection between the content provider 102 and the head end 112 while network 106 is implemented by the Internet, both networks 106, 110 may be the Internet, and so on.

The content 108(k) may then be stored in a database 114 as content 116(n), where "n" can be any integer from 1 to "N", on the head end 112 for communication over the network 106 to the client 104. In other words, the content 116(n) stored in the database 114 may be copies of the content 108(k) received from the content provider 102 over the network 110.

The head end 112, as illustrated, includes a distribution server 118 to format and distribute the content 116(n) over the network 106. Distribution from the head end 112 to the client 104 may be accomplished in a number of ways, including cable, RF, microwave, and satellite. Although the head end 112 is illustrated as separate from the content provider 102, the content provider 102 may also include the head end 112.

The head end 112 may also include a database 120 having a plurality of EPG data 122(m), where "m" can be any integer from one to "M". The EPG data 122(m) is used to construct an EPG 124 for display by the client 104 to a user. The EPG 124, for instance, may enable the user to observe a listing of television programs that are currently being broadcast from the head end 112, as well as a listing of television programs that will be broadcast in the future. Additionally, the EPG 124 may allow the viewer to navigate to a television program (e.g., content 116(n)) from the EPG 124 itself. To provide additional information to the user, the EPG 124 may include one or more content characteristics that describe content represented in the EPG 124. The content characteristics may include title, broadcast time, broadcast channel, output duration of the content, plot description, a rating (e.g., G, PG, PG-13, R, etc.), a principle actor's name, and so on. The EPG data may be communicated to the client 104 in a variety of ways. In one instance, the EPG data 122(m) is broadcast to the client 104 utilizing a carousel file system. The carousel file system repeatedly broadcasts the EPG data over an out-of-band (OOB) channel to the client 104 over the network 106. Although the head end 112 is illustrated as including the EPG data 122(m), in another instance the EPG data 122(m) is provided over the network 106 utilizing a separate EPG data service.

The client 104 may be configured as a computer that is capable of communicating over the network 106, such as a desktop computer, a mobile station, an entertainment appliance, a set-top box 126 that is communicatively coupled to a display device 128 as illustrated, and so forth. Although the set-top box 126 is shown separately from the display device 128, the set-top box 126 may be built into the display device 128 to form an integral unit. The client 104 may also relate to a person and/or entity that operate the client 104. In other words, client 104 may describe a logical client that includes a user and/or a machine. Although one client 104 is illustrated, a plurality of clients may be communicatively coupled to the network 106.

The client 104 may also include a database 130 having locally stored content 132(j), where "j" can be any integer from 1 to "J". For example, the client 104 may be configured as a DVR that stores the database 130 in hard disk memory. Due to the size of the memory, users are able to record content, such as content 116(n) streamed from the head end 112. As previously described, the DVR also offers control functions, such as the ability to pause content that is currently being broadcast and allows viewers to watch the content while still in progress from the point it was paused. The DVR plays back the content from disk memory, starting at the pause event, while continuing to record the currently-broadcast content in the disk memory. Additionally, the DVR may support other control functions, such as rewinding, fast forwarding a stored program, slow motion playback, and the like.

The client 104 is equipped with sufficient processing and storage capabilities to store and run a navigation module 134. The navigation module 134, when executed on the client 104, provides control functions for interacting with content. For example, the control functions may include the DVR control functions as previously discussed, as well as channel selection, electronic program guide (EPG) navigation, and so on. In another implementation, the navigation module 134 provides media player functionality, such as to play media having audio and/or visual data, such as MP3 data.

In a further implementation, the client 104 may execute the navigation module 134 to cause recordation of the content 116(n) at the distribution server 118. For example, the navigation module 134 may form a request that is communicated to the distribution server 118 over the network 106 to record content 108(k) communicated to the distribution server 130 from the content provider 102. The distribution server 118, in response to the request, records the requested content such that the navigation module 134 operates as a network digital video recorder (NDVR). Thus, through execution of the navigation module 134, the client 104 may playback locally-stored content 132(j), content 116(n) that is stored remotely over the network 106, and may even control the recordation and playback of the remotely stored content 116(n) to the client 104.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices. The content recordation techniques described below are platform-independent, meaning that the content recordation techniques may be implemented on a variety of commercial computing platforms having a variety of processors.

The environment 100 supports a variety of techniques for recordation of the content 132(j), 116(n) through use of a recording document 136. The recording document 136, for instance, describes content to be recorded and may conform to an extensible Markup Language (XML) schema that is parsable by a parser module 138 to locate a particular content item. For example, the recording document 136 may describe a title and a start time for a desired content item. The parser module 138 is executed on the distribution server 118 to compare the title and the start time described in the recording document with the EPG data 122(m) stored in the database 120 to determine if and when the particular content item is available. If the particular content item is available, a reference to the particular content item is added to a recording list 140 to cause the particular content item to be recorded. For example, the recording list 140 may be utilized by the distribution server 118 to record content 116(n) at the head end 112 in a NDVR scenario. In another example, the recording list 140 is communicated to the client 104 to cause the navigation module 134 to record content 132(j) locally in a DVR scenario. In a further example, the recording document 136 is communicated from the remote device 142 to the client 104 for parsing by the client 104, an example of which is shown in relation to FIG. 2B.

The recording document 136 may be provided in a variety of ways. As illustrated in FIG. 1, the recording document 136 is stored on a remote device 142 that is communicatively coupled to the network 106. Therefore, a user of the remote device 142 may provide the recording document 136 to the head end 112 to cause recording of content described by the recording document 136. Thus, the recording document 136 may be provided remotely by the remote device 142 such that the user does not need to interact with the client 104 locally to cause recordation of desired content. A variety of other ways of providing the recording document 136 are described in relation to FIGS. 2A, 2B, and 3.

Figure 2A:
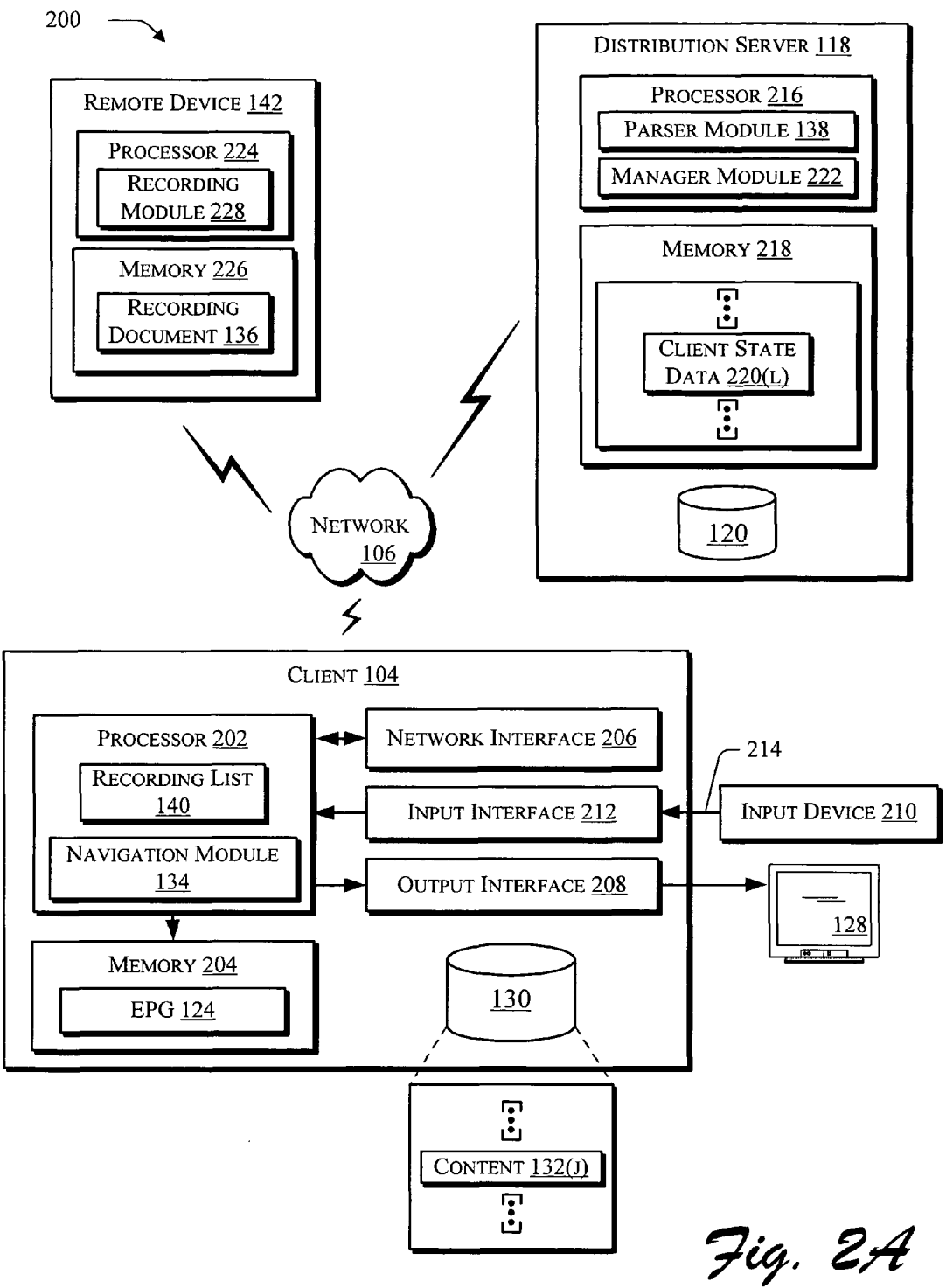
FIG. 2A is an illustration of an exemplary implementation showing a distribution server, the client, a head end, and a remote device of FIG. 1 in greater detail such that the head end is configured to record content.

FIG. 2A is an illustration of an exemplary system 200 showing the distribution server 118, the client 104, and the remote device 142 of FIG. 1 in greater detail. The client 104 includes a processor 202 and memory 204. Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Memory 204 may include one or more memory devices, such as read only memory (ROM), random access memory (RAM), hard disk memory, removable media memory devices, and so on.

The navigation module 134 and the recording list 140 are illustrated as being executed on the processor 202 and are storable in memory 204. The EPG 124 is illustrated as being stored in the memory 204 and is executable on the processor 202. It should be noted that in the illustrated system 200 of FIG. 2A, the recording list 140 is depicted within the client 104 to show that the recording list 140 may be configured for use by the navigation module 134 to cause recordation of content, further discussion of which may be found starting in relation to FIG. 4.

The client 104 may also include a network interface 206 for receiving the content 116(n) of FIG. 1 that is communicated (e.g., streamed) over the network 106. For example, the network interface 206 may be configured as a tuner that receives broadcast content from over the network 106, may be configured as a transmitter/receiver (transceiver) that is suitable for two-way communication over the network 106, and so on. Thus, the network interface 206 may be configured to transmit and receive messages over the network to and from the head end 112 and/or the remote device 142.

Content 116(n) received from the network 106 via the network interface 206 may be stored in the database 130 for later output by the client 104 and/or provide for immediate output of the content 116(n). The database 130 is illustrated as being separate from memory 204, but may also be included in memory 204. For example, the storage device for the database 124 may be configured as a hard disk drive and the memory 204 may be configured as RAM, both the memory 204 and the database 130 may be implemented as RAM, both the memory 204 and the database 130 may be implemented as removable memory, and so forth. The client 104 executes the navigation module 134 to retrieve the content 132(j) from the database 124 and output the content 132(j) through an output interface 208 for rendering on the display device 122. Thus, in this implementation, the client 104 is capable of operating as a DVR that stores and plays back the content 1320(j).

The client 104 may be locally controlled by a user via inputs provided by an input device 210. The inputs are received by the client 104 from an input interface 212 over a local connection 214. The input interface 212, local connection 214 and input device 210 may be configured in a variety of ways. For example, the input interface 212 may be configured as a wireless port, such as an infrared (IR) or Bluetooth wireless port, for receiving wireless communications from input device 210, such as a remote control device, a handheld input device, or any other wireless device, such as a wireless keyboard. In alternate embodiments, the input interface 212 may use an RF communication link or other mode of transmission to communicate with client 104, such as a wired connection which may include a universal serial bus (USB) connection, and so on.

When output of content is requested, the navigation module 134 is executed on the processor 202 to obtain content, such as from content 116(*n*) of FIG. 1 that is streamed from the distribution server 118 over the network 106, content 132(*j*) that is stored locally on the database 130, and so on. The navigation module 134 may also restore the content to the original encoded format as provided by the content provider 102 of FIG. 1. For example, content 116(*n*) of FIG. 1 may be compressed and then streamed from the distribution server 118 to the client 104. Therefore, when the navigation module 134 receives the content, the content may be decompressed for rendering by the display device 128.

The distribution server 118 also includes a processor 216 and memory 218. The parser module 138 is illustrated as being executed on the processor 216 and is storable in memory 218. The memory 218 of the distribution server 118 is also illustrated as including a plurality of client state data 220(*l*), where "l" can be any integer from 1 to "L". The client state data 220(*l*) is utilized to process requests to record content, such as at the head end 112 of FIG. 1 as content 116(*n*) and/or at the client in database 130 as content 132(*j*). For example, the distribution server 118 may include a content manager module 222 (hereinafter, "manager module") that is executable on the processor 216 to manage client 104 content access. The client state data 220(*l*), for instance, may specify parental blocks to prevent viewing of content items, may specify conditional access rights (e.g., digital access rights) of the client for particular items of content, rating limits, favorite channels, level of service provisioned, and so on. The manager module 222, when executed, may determine if the client 104 is permitted (i.e., authorized) to record the particular content item, and if so, the distribution server 118 causes the client 104, and specifically the navigation module 132, to record the particular content item. In this way, the head end 112 provides an authoritative source for client state data 220(*l*) in the system 200 and environment 100 as shown, respectively, in FIGS. 1 and 2. In an implementation, the distribution server 118 may be considered the primary source for the client state data 220(*l*) for a particular client, even over the client 104 itself. For example, by storing the client state data 220(*l*) on the distribution server 118, a user may switch set-top boxes without transferring client state data between the set-top boxes. Further discussion of use of the client state data 220(*l*) may be found in relation to FIG. 7.

The remote device 142 is also illustrated as including a processor 224 and memory 226. The recording document 136 is illustrated as being stored in memory 226 and is executable on the processor 224. The remote device 142 also includes a recording module 228 which is illustrated as being executed on the processor 224 and is storable in memory 226. The recording module 228, when executed, generates the recording document 136 for a particular content item. For example, the recording module 228 may provide a user interface for accepting user inputs that describe a particular content item. The user inputs are processed by the recording module 228 to generate a recording document 136 that follows a schema that is understood by the parser module 138. The parser module 138, when executed, parses the recording document 136 to locate and compare descriptive data in the recording document 136 with EPG data 122(*m*) in the database 120. EPG data 122(*m*) that matches the descriptive data is then utilized to determine how to record a particular content item described in the recording document 136. A reference to the particular content item is then added to the recording list 140 to cause the navigation module 134 to be executed on the client 104 to record the particular content item. A variety of other scenarios are also contemplated such that the user may cause recordation of content at the client 104 and/or the head end 112 of FIG. 1, further examples of which may be found in relation to the following figure.

Figure 2B:
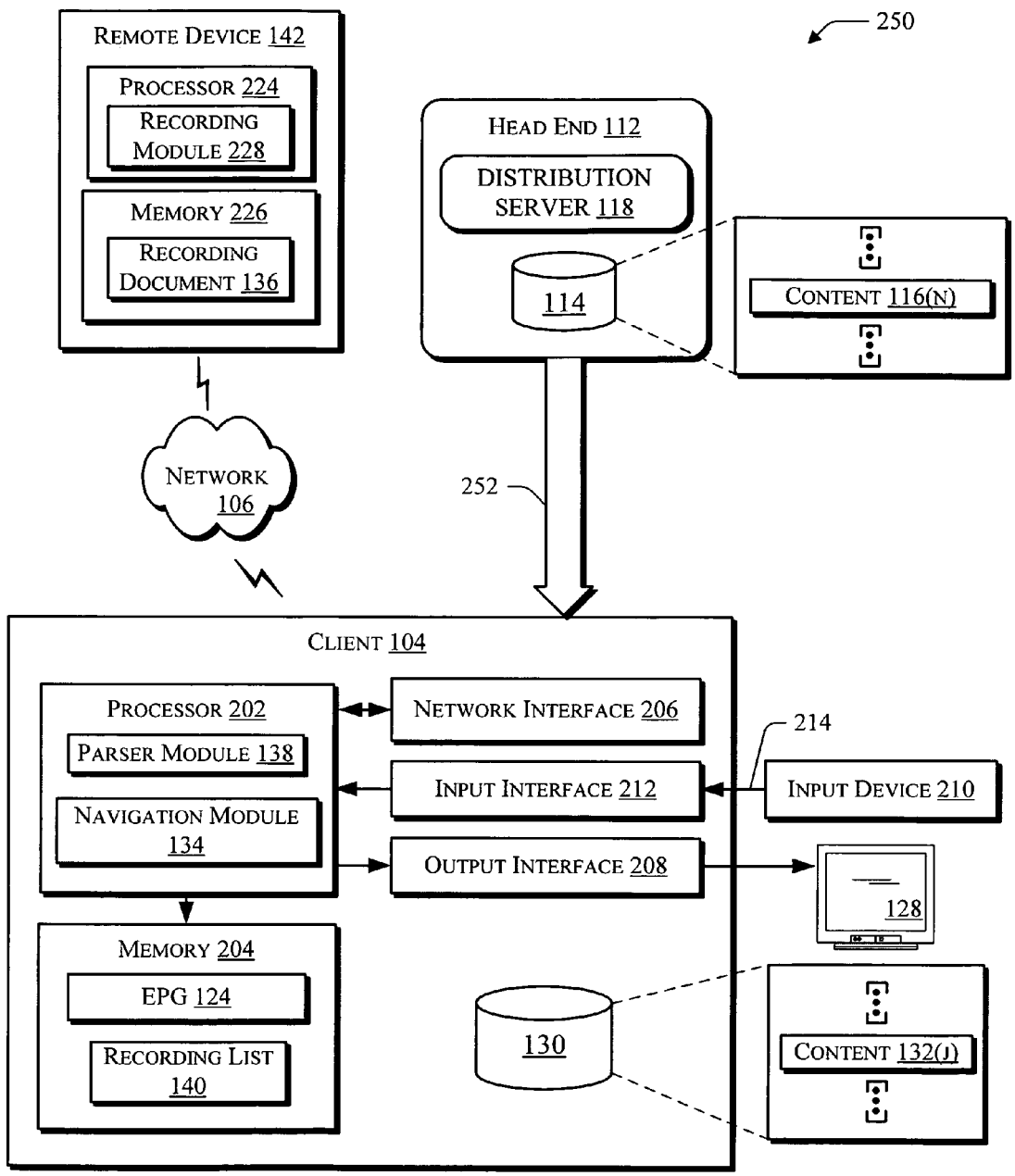
FIG. 2B is an illustration of another exemplary implementation showing a distribution server, the client, a head end, and a remote device of FIG. 1 in greater detail such that the client is configured to record content.

FIG. 2B is an illustration of an exemplary system 250 showing the distribution server 118, the client 104, and the remote device 142 of FIG. 1 in greater detail such that the client includes the functionality to parse a recording document. In the system 200 described in relation to FIG. 2A, the distribution server acted as a central repository for client state data 220(L) and executed the parser module 138 to parse the recording document 136.

In the exemplary system 250 illustrated in FIG. 2B, however, the client 104 executes the parser module 138 to parse the recording document 136 that is communicated from the remote device 142 over the network 106. The parser module 138 may then be utilized to populate the recording list 140 as previously described by comparing the recording document 136 with EPG 124 that is stored in the memory 204. Thus, in this instance, the head end 112 acts to broadcast content 116(*n*) over a broadcast network 252 and does not actively participate in the recordation of the content 132(*j*) on the client 104, further discussion of which may be found in relation to FIG. 6.

Figure 3:
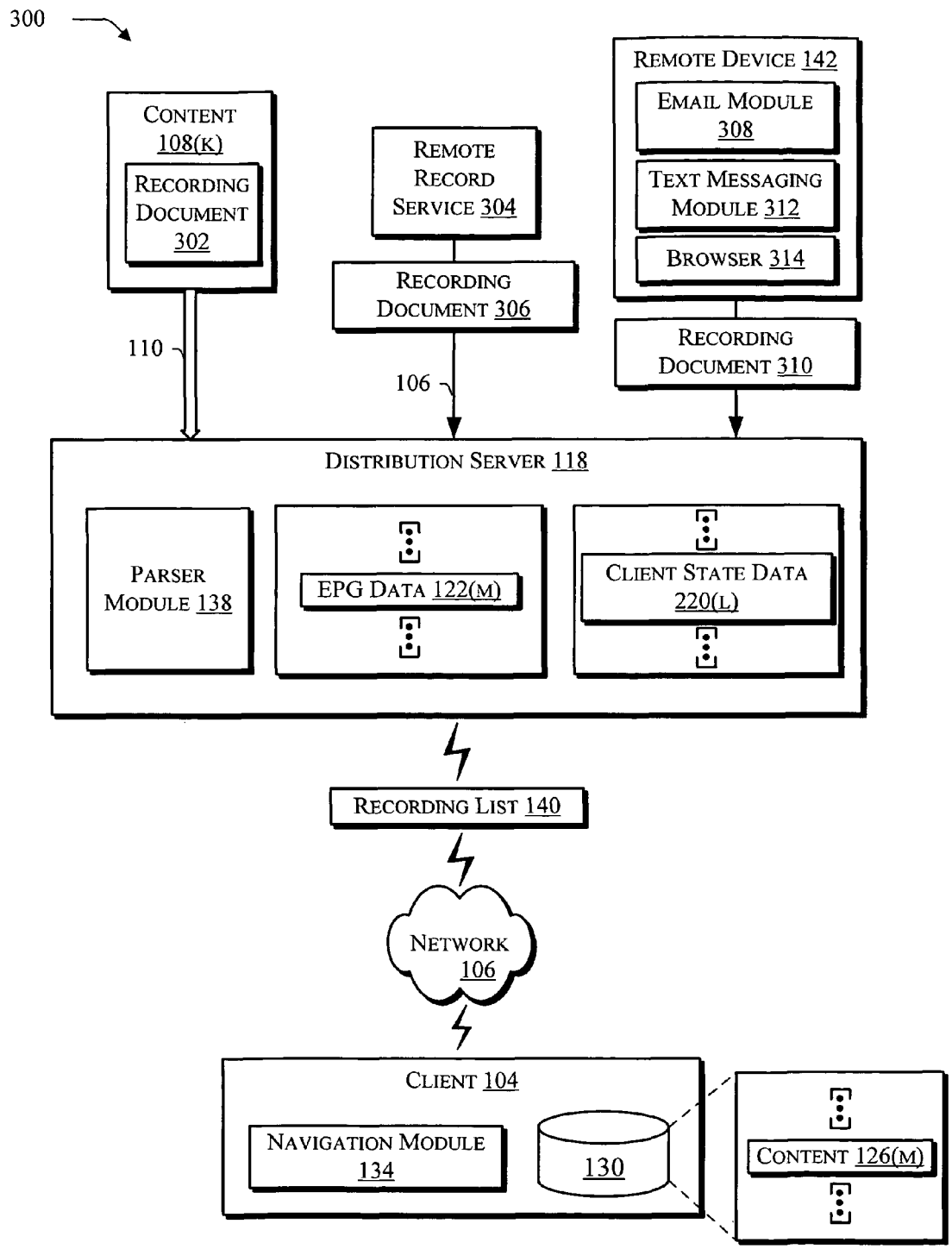
FIG. 3 is an illustration of a system showing a variety of content recordation techniques as implemented by the distribution server and the client of FIG. 2A.

FIG. 3 is an illustration of a system 300 showing a variety of content recordation techniques as implemented by the distribution server 118 and the client 104 of FIG. 2A. One such content recordation technique is the inclusion of the recording document 302 within content 108(*k*). For example, the client 104 may receive content 108(*k*) from the content provider 102 of FIG. 1. The content 108(*k*) in this example is a television program which includes credits which describe the actors, producers, and so on. The credits may also include a preview for next week's episode of the television program. The preview has an embedded recording document 302 which causes an interactive icon to appear that, when selected, allows the user to automatically schedule a recording for the next episode of the television program.

The recording document 302 is then communicated to the distribution server 118 over the network 110 for parsing by the parser module 138. The parser module 138, when executed, locates the particular content item (e.g., the next episode of the television program) based on the recording document 302 and the EPG data 122(*m*) and adds a reference to the particular content item to a recording list 140. The recording list 140 causes the navigation module 134 to record the content locally in the database 130 as content 132(*j*). Thus, the recording document 302 embedded in the content 108(*k*) provides for automatic recording of the next episode of the television program with minimal user intervention.

In another such technique, a remote content recordation technique is provided by using a remote record service 304. For example, the remote record service 304 may provide a web site which enables a user to select content for recording. The web site 304 may then communicate a recording document 306 that describes the content selected by the user to cause the client 104 to automatically record the selected content as previously described.

In a further such technique, the user interacts with the remote device 142 to remotely record content using the client 104. For example, the remote device 142 may execute an email module 308 that causes an email that contains a recording document 310 to be communicated to the distribution server 118. The distribution server 118 may then execute the parser module 138 to compare the descriptive data in the recording document 310 with the EPG data 122(m) to determine if the particular content item referenced in the email is available. If so, the parser module 138 may then be executed to determine if access to the particular content item is permitted by the client 104 based on the client state data 220(l). For example, the client state data 220(l) may indicate whether the user subscribes to a content service package that includes the particular content item. If the user does have conditional access rights, the particular content item is added to the recording list 140 for causing the navigation module 134 to record the particular content item as content 132(j) in the database 130.

In another example, the remote device 142 may include a text messaging module 312 to receive a text message from another remote device. The text message may describe a particular content item, such as by providing the title, names of actors, genre, and so on. The text message may be examined to dynamically generate the recording document 310 that contains the content descriptions from the text message. The recording document 310 may then be communicated to the distribution server 118 for processing as previously described. In this example, the recording document 310 is dynamically generated, further discussion of which may be found in relation to FIGS. 5-7. Although the system 300 of FIG. 3 described the execution of the parser module 138 on the distribution server 118, the parser module 138 may also be executed on the client 104. For example, the parser module 138, when executed on the client 104, may compare the descriptive data in the recording document 306 with the EPG 124 (e.g., the EPG data utilized to form the EPG stored on the client 104) to determine availability of the particular content item. Further discussion of execution of the parser module 138 by the client 104 may also be found in relation to FIGS. 5-7. Although a variety of exemplary content recordation techniques have been described, a variety of other content recordation techniques may also be provided that utilize a recording document for comparison with EPG data.

Exemplary Procedures

The following discussion describes content recordation techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

Figure 4:
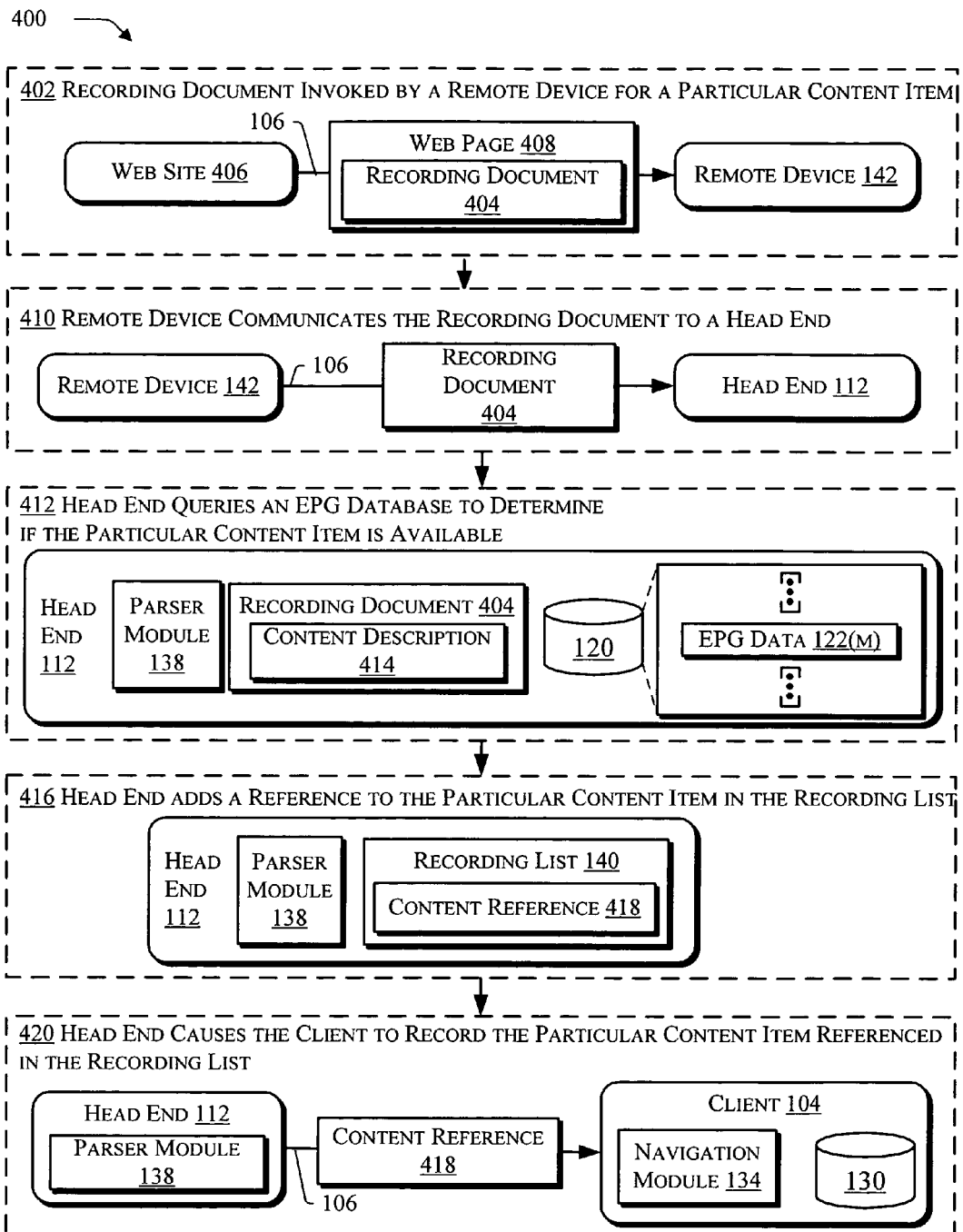
FIG. 4 is a flow diagram depicting a procedure in an exemplary implementation in which a recording document is utilized to record a particular content item.

FIG. 4 is a flow diagram depicting a procedure 400 in an exemplary implementation in which a recording document is utilized to record a particular content item. At block 402, a recording document 404 is invoked by a remote device 142 for a particular content item. For example, the remote device 142 may access a web site 406 that provides an output of a web page 408 for viewing at the remote device 142. The web page 408, when provided to the remote device 142, may also include the recording document 404 that describes a particular content item. For instance, the web page 408 may include a review of a television show that is available from a broadcast from a head end 112. If the user wishes to record the television show, the user selects a link in the web page 408, which causes the recording document to be invoked.

The recording document 404 in this example follows an XML recording schema. The XML recording schema is an abstract representation depicting the interrelationship between attributes and elements of an XML object, which in this instance is the recording document 404 or a portion of the recording document 404. An example of the recording document 404 which complies with an exemplary XML recording schema is shown as follows:

```
<?xml version="1.0" encoding="utf-8" ?>
<!-- Sample Click-to-Record (NBC Single-Episode Scenario) -->
<clickToRecord xmlns="urn:schemas-microsoft-com:ehome:clicktorecord">
    <ds:Signature xmlns:ds="http://www.w3.org/2000/09/xmldsig#">
        <!-- XML Signature goes here -->
    </ds:Signature>
    <body>
        <metadata>
            <!-- The following information should be considered insecure unless signed. -->
            <description>A very special episode of Friends.</description>
            <moreInfoUrl>http://www.nbc.com/friends/</moreInfoUrl>
        </metadata>
        <!-- hard prepad and postpad 5 minutes - if airing specified isn't found, suggest another one -->
        <programRecord prepadding="5" postpadding="5"
allowAlternateAirings="true" allowAlternateService="false">
            <program>
                <key field="urn:schemas-microsoft-com:ehome:epg:program#title"
match="exact">Friends</key>
                <key field="urn:schemas-microsoft-com:ehome:epg:program#episodetitle" match="exact">The One Where Chandler Marries Monica</key>
            </program>
            <service>
                <key field="urn:schemas-microsoft-com:ehome:epg:service#affiliate" match="startswith">NBC</key>
            </service>
            <!-- Folks in PST have a time (in UTC) specified -->
            <airing timeZone="EST">
                <key field="urn:schemas-microsoft-com:ehome:epg:airing#starttime">2003-10-15T08:00:00Z</key>
            </airing>
            <!-- Other folks record if the show is found within 3 hours of the UTC time specified -->
            <airing searchSpan="180">
```

-continued

```
        <key field="urn:schemas-microsoft-
com:ehome:epg:airing#starttime">2003-10-15T08:00:00Z</key>
      </siring>
    </programRecord>
  </body>
</clickToRecord>
```

The outermost element <clickToRecord> is the root element of the recording document 404, which is defined by the namespace "urn:schemas-microsoft-com:ehome:clicktorecord". The <clickToRecord> element contains an element: <body> plus an optional digital signature conforming to an XML Signature specification.

The <body> element contains a single <metadata> element followed by one or more <programRecord> elements. The <metadata> element may encapsulate several sub-elements to providing additional data that describes the requested content item. The following is a list of exemplary <metadata> sub-elements:

| Element | Usage |
| --- | --- |
| <description> | Description of the package (e.g., A Very Special Episode of Friends) |
| <expires> | Date/Time after which the recording document expires. |
| <moreInfoUrl> | Hyperlink to the source's website (e.g., http://entertainment.msn.com/tv) |
| <updateUrl> | Pointer to a URL that may contain updated versions of the recording document to account for schedule changes. |

One or more record definition elements may be included after the <metadata> element as shown in the above exemplary recording document 404. A <programRecord> record definition element is included which covers both one-time and series recording scenarios.

As shown in the sample document above, the <programRecord> element may include several optional attributes, examples of which are described as follows:

| Attribute | Default | Usage |
| --- | --- | --- |
| prepadding/ postpadding | 0/0 | Specifies pre-padding and/or post-padding of the recording in minutes. For example, padding may be utilized to account for a lack of clock synchronization between the head end 112 of FIG. 1 and the client 104. |
| allowAlternateAirings | true | Specifies how to handle instances in which a specified broadcast of a content item cannot be found. If this attribute is "true", a search for the same content item is performed for different scheduled times and the user is informed of the change, if any. If this attribute is"false", and the show is not found within the specified time window, then the request will fail and the user will be informed. |
| allowAlternateServices | false | Similar to the "allowAlternateAirings", however, by specifying "true" different content providers (e.g., broadcasters) may be specified. |
| programDuration | 0 | Specifies an output duration of the content item. This may be used if the content item is not found in the current EPG and a temporary recording event must be created. If 0, the content item must appear in the guide or the query fails. |
| firstRunOnly | false | Don't record reruns. |
| daysOfWeek | 0x7F | Indicates which days of the week a content item may be recorded for manual and generic "keyword" requests. |
| isRecurring | false | This element differentiates between one-time and series request behavior for the content item. |

The <programRecord> element may include a variety of element types as children that further describe the particular content item, such as <program> (e.g., a title of a television program), <service> (e.g., a broadcast channel that provides the television program), and <airing> (e.g., a time when the television program is to be broadcast). Each of these elements may occur more than once in the recording document 404.

At block 410, the remote device communicates the recording document 404 to the head end 112. For example, the recording document 404 may be transmitted (i.e., pushed) over the network 106, implemented using the Internet, for receipt by the head end 112. In another example, the recording document is "pulled" from the remote device 142 by the head end 112. For instance, the head end 112 may be configured to periodically monitor the remote device 142 for presence of the recording document 404.

At block 412, the head end 112 queries the database 120 of EPG data 122(m) to determine if the particular content item described by the recording document 404 is available. The head end 122, for instance, may execute the parser module 138 to locate data in the recording document 404 that describes the particular content item, which is illustrated at block 412 of FIG. 4 as "content description 414". The content description 414 (i.e., the descriptive data) is then compared with the EPG data 122(m) to find a match. For example, the <program>, <service>, and <airing> elements may be compared with the EPG data 122(m) to find a particular content item which most satisfies those elements. Thus, the parser module 138, when executed, may determine how to record the particular content item that is described by the recording document by cross-referencing the content description 414 with the EPG data 122(m).

In an implementation, the head end 112 utilizes minimum search field requirements before querying the database that contains EPG data 122(m) (block 412). For example, specific combinations of search criteria, when included in a recording document, may result in a failure in the query (block 412) due to insufficient amount of information (e.g., elements) to locate the particular content item. For instance, a recording document that only specifies a <service> (e.g., a broadcast channel) may be considered as invalid unless a corresponding <program> and/or <airing> is provided. The following is a listing of exemplary legal combinations of the three elements previously described:

<program> (e.g., record this program anytime it is streamed, on any service);

<program>, <service> (record this program anytime it is streamed from a specified service);

<program>, <airing> (record this program at this time from any service);

<program>, <service>, <airing> (record this program at this time from this service); and <service>, <airing> (record the named service at the given time).

Although three elements are described, a variety of other elements and combinations thereof may also be included in the recording document 404 to locate a particular content item.

Through use of elements and different combinations of the elements, for example, search criteria may be broadly or narrowly specified depending upon the desired implementation. For instance, a fan website may post a recording document for recording any episode of a particular television program no matter what time it is broadcast and no matter which channel broadcasts the television program. Such a recording document may specify the title of the television program (e.g., <program>) without supplying any other additional elements. In another instance, a website provided by a particular content broadcaster may supply a recording document that specifies episodes that are broadcast by that particular content broadcaster and does not wish to include episodes that are broadcast by rival broadcasters. In this instance, the recording document specifies the title of the television program (e.g., <program>) and the broadcaster (e.g., <service>).

Although some examples of search criteria have been described, a variety of other search criteria may also be specified in a recording document. For example, the recording document may specify alternative matching attributes, such as "(<program> and <service>) or (<service> and <airing>)". Additionally, each of the elements may be specified in a variety of ways. For instance, a target service may be specified by call sign, name, affiliate, and so on. Thus, the recording document may flexibly describe search criteria as contemplated by a creator of the recording document.

The search criteria (i.e., elements) may also be processed so that the recording document is transportable between users having different respective content providers. For example, users may receive content through different channel lineups, the users may be located in different time zones, and so on. Time-based search criteria, for instance, may be specified using any time-zone and then normalized to a local time-zone when parsed. In another instance, the search criteria may be restricted to within a particular offset from coordinated universal time (UTC). Multiple criteria may be specified in this way so one time can be specified that applies only to Pacific Standard Time (PST) and Eastern Standard Time (EST), for example, and another time set for Mountain Standard Time (MST) and Central Standard Time (CST). In a further instance, a search "window" can be specified to allow the episode to be matched within a specific range of time around the time specified.

If the particular content item is available, then the head end adds a content reference 418 to the particular content item in the recording list 140 (block 416). The content reference 418, for instance, may specify a broadcast channel and time to record the referenced content item, map to a memory location of the particular content item in a database 114 of FIG. 1 at the head end 112, and so on.

At block 420, the head end 112 causes the client 104 to record the particular content item referenced in the recording list 140. For example, the head end 112 may execute the parser module 138 to communicate the content reference 418 over the network 106 to the client 104. The navigation module 134, upon receipt of the content reference 418, records the particular content item to the database 130 as specified by the content reference 418. Thus, in this example, the remote device 142 is able to cause the client 104 to record a particular content item without direct interaction with the client 104.

Figure 5:
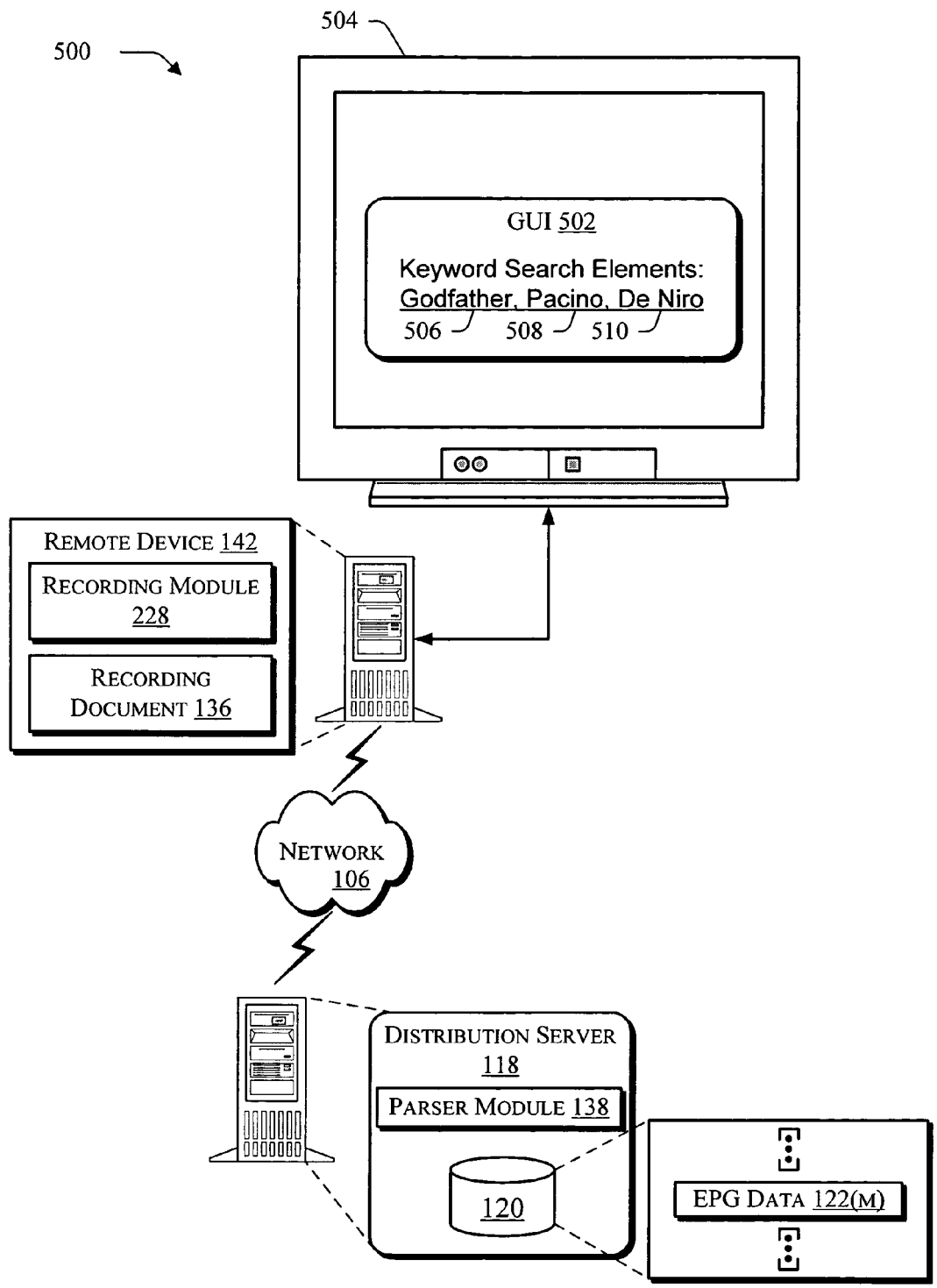
FIG. 5 is an illustration of a system in an exemplary implementation in which a graphical user interface (GUI) is provided by a recording module to dynamically generate a recording document based on user input.

FIG. 5 is an illustration of a system 500 in an exemplary implementation in which a graphical user interface (GUI) 502 is provided by the recording module 228 to dynamically generate the recording document 136 based on user input. In the previously described procedure 400 of FIG. 4, the recording document 404 was preconfigured and obtained to record a particular content item. The recording document may also be dynamically generated based on user input to describe a particular content item for recording.

The remote device 142, for example, includes the recording module 228. The recording module 228, when executed on the remote device 142, provides an output for display on a display device 504 of the GUI 502. The GUI 504 in this example provides an interface for entering keyword search elements which may be utilized to locate a particular content item. For instance, the user may utilize an input device to enter a portion of a title and actors in the particular content item, such as "Godfather" 506, "Pacino" 508, and "DeNiro" 510. The recording module 228 utilizes these elements to form the recording document 136. The recording document 136 is then communicated over the network 106 to the distribution server 118 and parsed by the parser module 138 as previously described to determine if the described particular content item of the recording document 136 is available.

In this example, the elements "Godfather" 506, "Pacino" 508 and "De Niro" 510 are utilized to determine if the particular content item "Godfather II" is available by finding a content item described in the EPG data 122(*m*) of FIG. 1 that satisfies each of these elements. In another implementation, a "best match" may be performed so that the content item described in the EPG data 122(*m*) which satisfies the most elements in the recording document 136 is reported to the user via the GUI 504. For example, Godfather II may not be available based on a query of the EPG data 122(*m*). However, the movie Godfather I, which satisfies the elements "Godfather" 506 and "Pacino" 508 may be available. Therefore a result of the query, which indicates the availability of Godfather I, is output via the GUI 504 so that the user can decide whether to record that particular content item.

Figure 6:
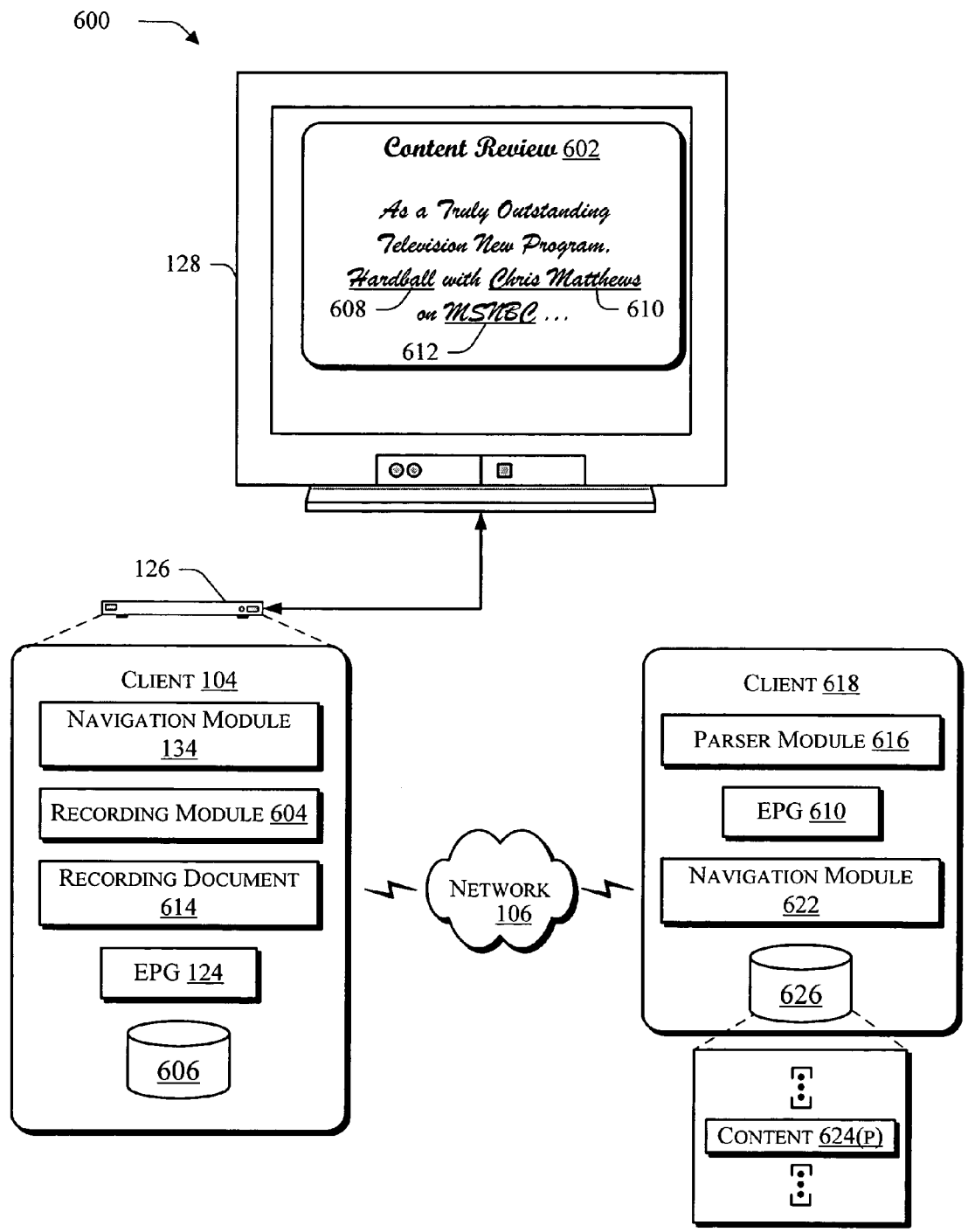
FIG. 6 is an illustration of a system in an exemplary implementation in which the recording module is executed to examine a textual description of content to dynamically generate a recording document.

FIG. 6 is an illustration of a system 600 in an exemplary implementation in which the recording module is executed to examine a textual description of content to dynamically generate a recording document. In the system 500 of FIG. 5, the recording document 136 was dynamically generated based on user input. The recording document 136 may also be dynamically generated without user input.

The client 104, for instance, may be configured as a set-top box 126 that is communicatively coupled to the display device 128. The client 104 executes the navigation module 134 to access a textual description of a particular content item over the network 106, which in FIG. 6 is illustrated as a content review 602 that is available from a web site. The user, upon reading the content review 602, may desire to record the particular content item described in the review. In this instance, however, the content review 602 does not include a preconfigured recording document as previously described in relation to FIG. 3. Therefore, the client 104 executes a recording module 604 to dynamically generate the recording document 136 based on the content review 602.

The recording module 604, for example, may be executed to examine the content review 602 to find one or more words which describe the particular content item. In an implementation, the recording module 604 compares words in the content review 602 with a database 606 of descriptive words which may be utilized to describe content, such as names of broadcast channels, titles, actors, and so on. For instance, the recording module 604, when executed, locates the words "hardball" 608, "Chris Matthews" 610, and "MSNBC" 612 (MSNBC is a trademark of MSNBC Cable L.L.C. of New York, N.Y.). The recording module 604 then generates a recording document 614 and communicates it over the network 106 to a parser module 616 that is executable on another client 618.

The parser module 616, when executed on the other client 618, compares the recording document 614 with an EPG 620 to determine if the particular content item described in the recording document 614 is available, and if so, causes a navigation module 622 to record the particular content item as content 624(p), where "p" can be any integer from one to "P", in the database 626.

In another implementation, the recording module 604 and the parser module 616 are executed to directly compare words 608-612 in the content review 602 with the EPG 124 that is stored on the client 104. In other words, the EPG 124 (and more particularly the EPG data that is utilized to configure the EPG 124) provides the database 606. In this implementation, the recording module 604 does not wait until after the recording document 608 is completely generated to perform the comparison, but rather compares words 608-612 with the EPG 124.

It should be noted that in the system 600 of FIG. 6, the client 104 executes the recording module 604 to generate the recording document 136. Another client 618 executes the parser module 616 to determine if the particular content item is available based on another EPG 620 that is stored locally on the other client 618. Thus, the content recordation techniques may also be utilized for interaction between clients 104, 618 without directly involving the head end 112 of FIG. 1. Further discussion of client execution of the parser module may be found in relation to the following figure.

Figure 7:
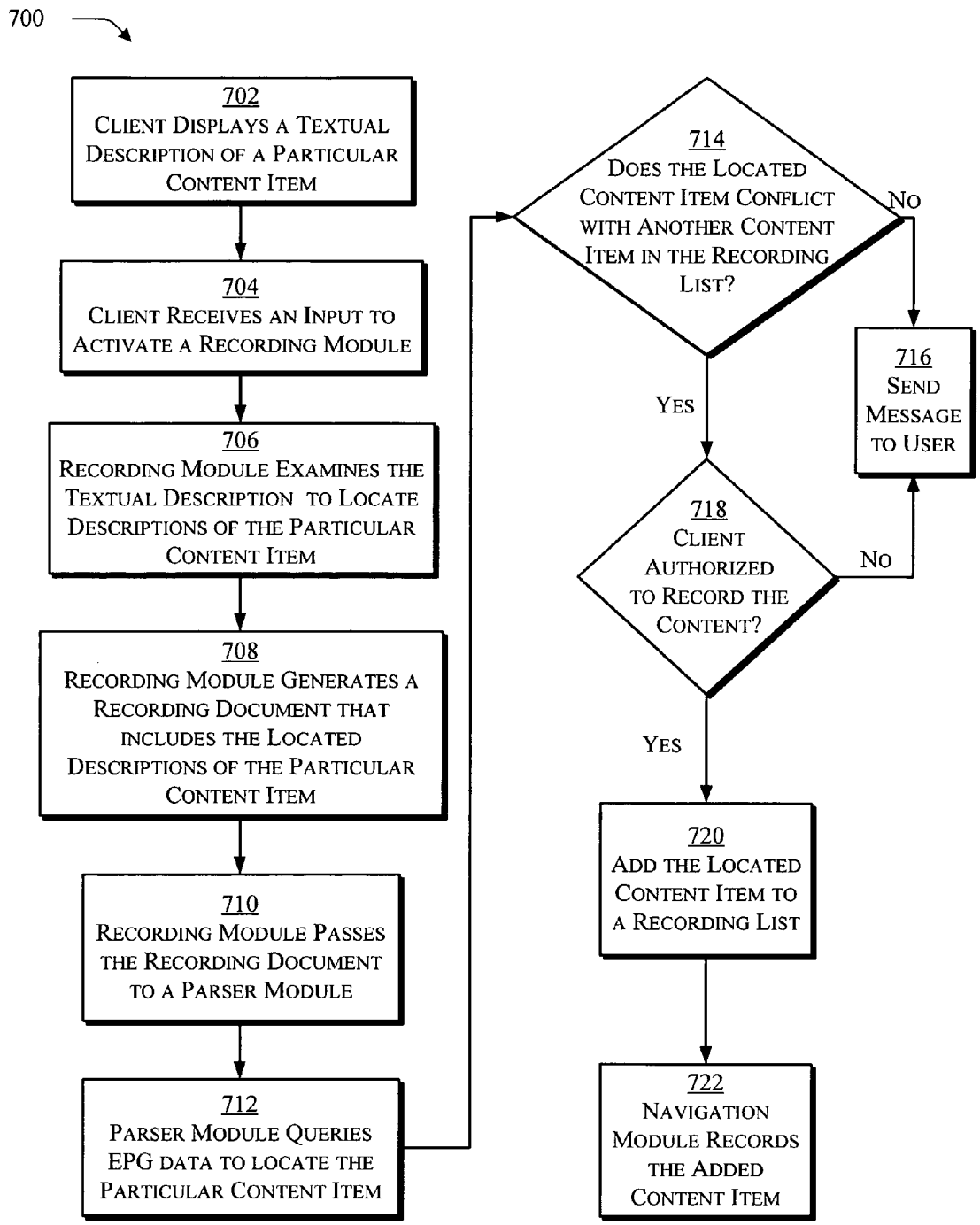
FIG. 7 is a flow diagram depicting a procedure in an exemplary implementation in which a client dynamically generates a recording document that is utilized to determine availability of a particular content item for recording by the client.

FIG. 7 is a flow diagram depicting a procedure 700 in an exemplary implementation in which a client dynamically generates a recording document that is utilized to determine availability of a particular content item for recording by the client. At block 702, the client displays a textual description of a particular content item. A variety of textual descriptions may be displayed, such as the content review 602 of FIG. 6, an email, a text message communicated from another client, and so on.

At block 704, the client receives an input to active a recording module. For example, the client may provide an icon for selection by the user, a drop-down menu for activation of the recording module, and so on. At block 706, the recording module, when executed, examines the text to locate descriptions of the particular content item. For instance, the recording module may first examine the text to locate words which are typically used to describe the <program>, <service>, and <airing> elements that were previously described. The recording module may also locate other words which describe the particular content item, such as actor, output duration of the content, genre, start time, stop time, plot, and so on.

At block 708, the recording module generates a recording document that includes the located descriptions of the particular content item. The recording document, for instance, may be configured according to an XML recording schema that is understood by the parser module. The recording module then passes the recording document to the parser module (block 710).

At block 712, the parser module queries EPG data to locate the particular content item. In a first scenario, the parser module is executed on the client to query an EPG that is stored locally on the client. In a second scenario, the parser module is executed on the client to query EPG data that is stored at the head end, such as the EPG data 122(m) stored in the database 120 at the head end 112 of FIG. 1.

At decision block 714, a determination is made as to whether the located content item conflicts with another content item in the recording list. For example, the recording list may be configured for implementation by a DVR that is capable of recording a single content item at any one point in time. Therefore, the parser module may be executed to flag conflicts in the recording list so that the referenced content items are recorded as desired. If there is a conflict (block 714), a message is sent to the user (block 716) so that the user may decide which of the conflicting content items is to be recorded, if any.

If the located content item does not conflict with another content item in the recording list (block 714), a determination is made as to whether the client is authorized to record the content (block 718). For example, the parser module may be executed to determine from the client state data 220(l) stored at the distribution server 118 of FIG. 2 whether the client is permitted to access the referenced content item. The client state data 220(l), for instance, may be utilized to indicate a variety of conditional access rights, such as parental blocks, digital rights management (DRM), content subscriptions, and so on.

If the client is authorized to record the content (block 718), then the located content item is added to a recording list (block 720). For instance, a reference to the located content item may be added which describes how to record the located content item, such as date, time, and channel of a broadcast of a television program, a memory location, and so on. The recording list may then be utilized to cause the navigation module to record the added content item (block 722).

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:
1. A method comprising:
receiving a recording document via a network that describes a content item but does not describe whether the content item is available for recording or how the content item is to be recorded, wherein the recording document was generated by a recording module configured to examine a textual description of the content item to locate one or more words that describe the content item and dynamically generate the recording document, wherein the recording document includes the located one or more words from the textual description;
querying electronic program guide (EPG) data to determine if the content item described in the recording document is available for recording without user intervention, and if so, how the content item is to be recorded;

examining client state data that describes conditional access rights of a client to determine if recordation of the content item for the client is permitted using digital rights management; and if the content item is available and recordation is permitted, adding a reference in a recording list for causing recordation of the content item without user intervention.

2. A method as described in claim 1, wherein the querying is performed by execution of a parser module on a head end.

3. A method as described in claim 1, wherein:
the querying is performed by execution of a parser module on a head end; and
the reference in the recording list is for causing recordation of the content item by a client.

4. A method as described in claim 1, wherein the querying is performed by execution of a parser module on a client.

5. A method as described in claim 1, wherein:
the query is performed at a client; and
the reference in the recording list is for causing recordation of the content item at a head end.

6. A method as described in claim 1, further comprising determining if the available content item conflicts with another content item in the recording list.

7. A method as described in claim 1, wherein the recording document describes the content item through at least one of a restrictive criterion, a service, a time, or a genre.

8. A method as described in claim 1, wherein the textual description is selected from the group consisting of:
one or more words entered by a user via a user interface;
an article;
a text message;
an email; and
another content item.

9. A computer-implemented method comprising:
examining, by a recording module, a textual description of a content item to locate one or more words that describe the content item;
dynamically generating, by the recording module, a recording document that includes the located one or more words;
comparing the one or more words in the generated recording document with electronic program guide (EPG) data to determine if the content item is available for recording; and
if the content item is available, adding a reference in a recording list to cause recordation of the content item.

10. A computer-implemented method as described in claim 9, wherein the content item is selected from the group consisting of:
a television program;
a movie;
a picture;
a music file; and
media.

11. A computer-implemented method as described in claim 9, wherein:
the examining is performed by executing a recording module on a client; and
the comparing and the adding are performed by executing a parser module on a head end.

12. A computer-implemented method as described in claim 9, wherein the examining, the comparing, and the adding are performed by executing a recording module and a parser module on a client.

13. A computer-implemented method as described in claim 9, further comprising:
communicating the recording document to a head end which executes a parser module to perform the comparing and the adding; and
communicating the recording list to a client to cause recordation of the content item described in the EPG data through execution of a navigation module on the client.

14. A computer-implemented method as described in claim 9, further comprising determining if the client is authorized to record the content item.

15. A computer implemented method as described in claim 14, wherein the determining is performed at a head end using client state data that is stored on the head end.

16. One or more computer readable memory devices comprising computer executable instructions that, when executed by a computer, direct the computer to:
examine, by a recording module, a textual description of a content item to locate one or more words that describe the content item;
dynamically generate, by the recording module, a recording document having the located one or more words; and
form a communication for communicating the recording document for comparison with electronic program guide (EPG) data to determine if the content item described by the recording document is available for recording, and if so, how the content item is to be recorded.

17. One or more computer readable memory devices as described in claim 16, wherein the computer executable instructions further direct the computer to:
determine if the content item described by the recording document is available for recording; and
if the content item is available, add a reference to the available content item to a recording list.

18. One or more computer readable memory devices as described in claim 16, wherein the computer executable instructions further direct the computer to examine client state data that describes conditional access rights of a plurality of clients to determine if recordation of the content item for a particular said client is permitted.

19. One or more computer readable memory devices as described in claim 16, wherein the computer executable instructions further direct the computer to determine if the available content item conflicts with another content item in a recording list.

20. One or more computer readable memory devices as described in claim 16, wherein the textual description is selected from the group consisting of:
one or more words entered by a user via a user interface;
an article;
a text message;
an email; and
another content item.

21. A head end comprising:
a processor; and
memory configured to maintain:
electronic program guide (EPG) data;
a recording document having a plurality of elements which describe a content item, wherein the recording document was generated by a recording module configured to examine a textual description of the content item to locate one or more words that describe the content item and dynamically generate the recording document, wherein the recording document includes the located one or more words; and
a parser module that is executable on the processor without user intervention to:

determine if the content item described in the recording document is available for recording by comparing at least one said element with the electronic program guide (EPG) data;

examine client state data that describes conditional access rights of a plurality of clients to determine if recordation of the content item for a particular said client is permitted based on one or more parental blocks; and if the content item is available and recordation of the content item for the particular said client is permitted, add a reference to a recording list describing how the content item is to be recorded for causing recordation of the content item in the memory for access by the particular said client.

22. A head end as described in claim 21, wherein the textual description is selected from the group consisting of:
one or more words entered by a user via a user interface;
an article;
a text message;
an email; and
another content item.

23. A head end as described in claim 21, wherein the parser module is further executable on the processor to determine if the available content item conflicts with another content item referenced in the recording list.

24. A client comprising:
a processor; and
memory configured to maintain:
an electronic program guide (EPG) formed from a plurality of EPG data;
a recording document having a plurality of elements which describe a content item, wherein the recording document was generated by a recording module configured to examine a textual description of the content item to locate one or more words that describe the content item and dynamically generate the recording document, wherein the recording document includes the located one or more words from the textual description; and
a parser module that is executable on the processor to:
determine, without user intervention, if the content item described in the recording document is available for recording by comparing at least one said element with the electronic program guide (EPG) data;
examine client state data, which describes conditional access rights, to determine if recordation of the content item is permitted based on one or more content subscriptions; and
if the content item is available and recordation is permitted, add a reference in a recording list, based on the query and without user intervention, for causing recordation of the content item.

25. A client as described in claim 24, wherein the reference in the recording list is for causing recordation of the content item at a head end.

26. A client as described in claim 24, wherein the reference in the recording list is for causing recordation of the content item through execution of a navigation module on the client.

27. A client as described in claim 24, wherein the textual description is selected from the group consisting of:
one or more words entered by a user via a user interface;
an article;
a text message;
an email; and
another content item.

28. A client as described in claim 24, wherein the parser module is further executable on the processor to determine if the available content item conflicts with another content item in the recording list.

29. A system comprising:
a network;
a head end that is communicatively coupled to the network, includes a database having electronic program guide (EPG) data, and has a parser module that is executable thereon without user intervention to:
query the EPG data to determine if a content item described in a recording document that is received from over the network is available for recording, wherein the recording document was generated by a recording module configured to examine a textual description of the content item to locate one or more words that describe the content item and dynamically generate the recording document, wherein the recording document includes the located one or more words from the textual description;
if the content item is available, examine client state data that describes conditional access rights of a plurality of clients to determine if recordation of the content item for a particular said client is permitted;
if recordation of the content item for the particular said client is permitted, add a reference in a recording list for causing recordation of the content item; and
form a communication for communicating the recording list via the network; and
the particular said client that is communicatively coupled to the network and includes a navigation module that is executable thereon to:
receive the communication having the recording list; and
record the referenced content item.

* * * * *